US012548672B2

(12) United States Patent
Pal et al.

(10) Patent No.: US 12,548,672 B2
(45) Date of Patent: Feb. 10, 2026

(54) SYSTEM AND METHODS FOR AUTOMATICALLY RECOMMENDING RADIOLOGY PROTOCOLS USING MACHINE LEARNING TECHNIQUES

(71) Applicants: GE Precision Healthcare LLC, Waukesha, WI (US); The Board of Trustees of the Leland Stanford Junior University, Stanford, CA (US)

(72) Inventors: Debashish Pal, Sunnyvale, CA (US); Yaxi Shen, Waukesha, WI (US); Vignesh Doraiswamy, New Berlin, WI (US); Raghu Prasad, Bangalore (IN); Supreeth Dhareshwar, Bangalore (IN); Naeim Bahrami, San Diego, CA (US); Andreas Loening, Stanford, CA (US); Akshay Chaudhari, Stanford, CA (US); Peyman Shokrollahi, Palo Alto, CA (US); Juan Manuel Zambrano Chaves, Stanford, CA (US)

(73) Assignees: GE Precision Healthcare LLC, Waukesha, WI (US); The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 18/713,588

(22) PCT Filed: Nov. 23, 2022

(86) PCT No.: PCT/US2022/080441
§ 371 (c)(1),
(2) Date: May 24, 2024

(87) PCT Pub. No.: WO2023/097285
PCT Pub. Date: Jun. 1, 2023

(65) Prior Publication Data
US 2025/0014740 A1    Jan. 9, 2025

(30) Foreign Application Priority Data

Nov. 25, 2021 (IN) .............................. 202141054620

(51) Int. Cl.
*G16H 40/63* (2018.01)
*G16H 30/20* (2018.01)

(52) U.S. Cl.
CPC .............. *G16H 40/63* (2018.01); *G16H 30/20* (2018.01)

(58) Field of Classification Search
CPC .......... G06N 3/09; G06N 3/045; G06N 3/084; G06N 3/0442; G16H 40/20; G16H 40/63;
(Continued)

(56) References Cited

U.S. PATENT DOCUMENTS

2015/0247790 A1*  9/2015  Okumus ............ G01N 15/1484
                                                   435/283.1
2019/0220975 A1*  7/2019  Hsieh ....................... G06N 3/08
(Continued)

FOREIGN PATENT DOCUMENTS

EP          3324319 A1       5/2018
WO   WO 2020193966 A1 *    10/2020
WO       2021108398 A1       6/2021

OTHER PUBLICATIONS

EP application 22899558.5 filed May 16, 2024—extended Search Report issued Sep. 8, 2025; 11 pages.

*Primary Examiner* — Igor N Borissov

(57) ABSTRACT

Various methods and systems are provided for automatically recommending one or more radiology protocols based on an imaging examination order which includes both structured and unstructured data. In one example, a method includes receiving an imaging examination order requesting an imaging examination, wherein the imaging examination order comprises structured data and unstructured text, converting (Continued)

the unstructured text into one or more feature vectors, mapping the structured data and the one or more feature vectors to a standardized radiology protocol representation using an imaging examination order classifier, and mapping the standardized radiology protocol representation to a site-specific radiology protocol using a site-specific radiology protocol translator.

18 Claims, 14 Drawing Sheets

(58) Field of Classification Search
CPC ........ G16H 30/20; G16H 40/60; G16H 15/00; G06T 7/00
USPC ............................................................ 705/2
See application file for complete search history.

(56) References Cited

U.S. PATENT DOCUMENTS

2020/0357117 A1* 11/2020 Lyman ................... G06T 7/0012
2021/0005310 A1* 1/2021 Noro ....................... G16H 40/20

* cited by examiner

SYSTEM AND METHODS FOR AUTOMATICALLY RECOMMENDING RADIOLOGY PROTOCOLS USING MACHINE LEARNING TECHNIQUES

CROSS REFERENCE TO RELATED APPLICATION

The present application claims priority to Indian Patent Application No. 202141054620 filed on Nov. 25, 2021, and claims priority to PCT Patent Application No. PCT/US2022/080441, filed Nov. 23, 2022. The entire contents of the above-listed applications are hereby incorporated by reference for all purposes.

FIELD

This disclosure relates generally to utilizing machine learning techniques to provide radiology protocol recommendations in a site-specific format (e.g., specific to a particular hospital or region).

BACKGROUND

When doctors consult with patients, an imaging examination (e.g., a computerized tomography (CT) scan) is frequently requested to learn more about the condition of the patient. These imaging examinations are initiated by a medical doctor (or other care provider) filling out an imaging examination order required to satisfy comprehensive billing guidelines in view of the patient's specific situation. The imaging examination order may include a study code, a procedure description, patient information (e.g., height, weight, age, patient name/ID, etc.) and other order-related information (e.g., reason for the exam, order questions, and so forth). Conventionally, these imaging examination orders are reviewed by an authorized party, such as a radiologist or technologist, who will, based on the imaging examination order, and in light of the patient's medical records, assign a radiology protocol tailored to the patient. The radiology protocol generally provides greater detail than the imaging examination order regarding the imaging examination. The radiology protocol is then used by a technologist operating an imaging device to select a machine level protocol, which is then executed by the imaging device to perform the imaging examination.

Conventional approaches for determining a radiology protocol based on an imaging examination order rely on manual review of patient medical records, and the imaging examination order, by a radiologist or technologist, which is both time consuming (a survey of 150 radiologists showed 1.3+ hours a day are spent selecting radiology protocols), expensive, and in some instances inconsistent. Automating selection of a radiology protocol based on an imaging examination order may increase speed and consistency of an imaging examination workflow, while reducing costs, however, attempts to automate radiology protocol selection have been limited by the variability of format of the imaging examination order and the patient medical records, which may include a mix of both structured data (e.g., tables with pre-determined fields and either numerical or categorical values) and unstructured text (e.g., free-text or "natural language" descriptions of patient indications, previous medical treatments, doctor comments, etc.). Further, variability in the format of radiology protocols presents an additional challenge to automation of radiology protocol selection, as each site (e.g., healthcare provider network, hospital, etc.) may express radiology protocols in differing formats. Thus, it is generally desired to explore approaches for automating radiology protocol selection in a manner which is robust to variability in format of the imaging examination orders and patient medical records, which is efficiently scalable to sites using distinct formats for expressing radiology protocols.

BRIEF DESCRIPTION

In one embodiment, a method for automatically recommending a radiology protocol based on an imaging examination order comprises, receiving an imaging examination order requesting an imaging examination, wherein the imaging examination order comprises structured data and unstructured text, converting the unstructured text into one or more feature vectors, mapping the structured data and the one or more feature vectors to a standardized radiology protocol representation using an imaging examination order classifier, and mapping the standardized radiology protocol representation to a site-specific radiology protocol using a site-specific radiology protocol translator.

In this way, unstructured text may be leveraged along with structured data to predict an appropriate radiology protocol for a patient, for a given imaging examination order. Further, the above approach discloses using a first machine learning model, the imaging examination order classifier, to map the imaging examination order to a site independent intermediate representation of a radiology protocol, herein referred to as a standardized radiology protocol representation. The site independent standardized radiology protocol representation may then be mapped to a site-specific radiology protocol using the site-specific radiology protocol translator. In this way, the imaging examination order classifier and the site-specific radiology protocol translator may be independently trained, thus enabling a single imaging examination order classifier to be pre-trained and serve multiple sites, with the site-specific radiology protocol translator being trained locally (e.g., at a particular hospital or healthcare network), thus improving the scalability of the automatic radiology protocol recommendation approach.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
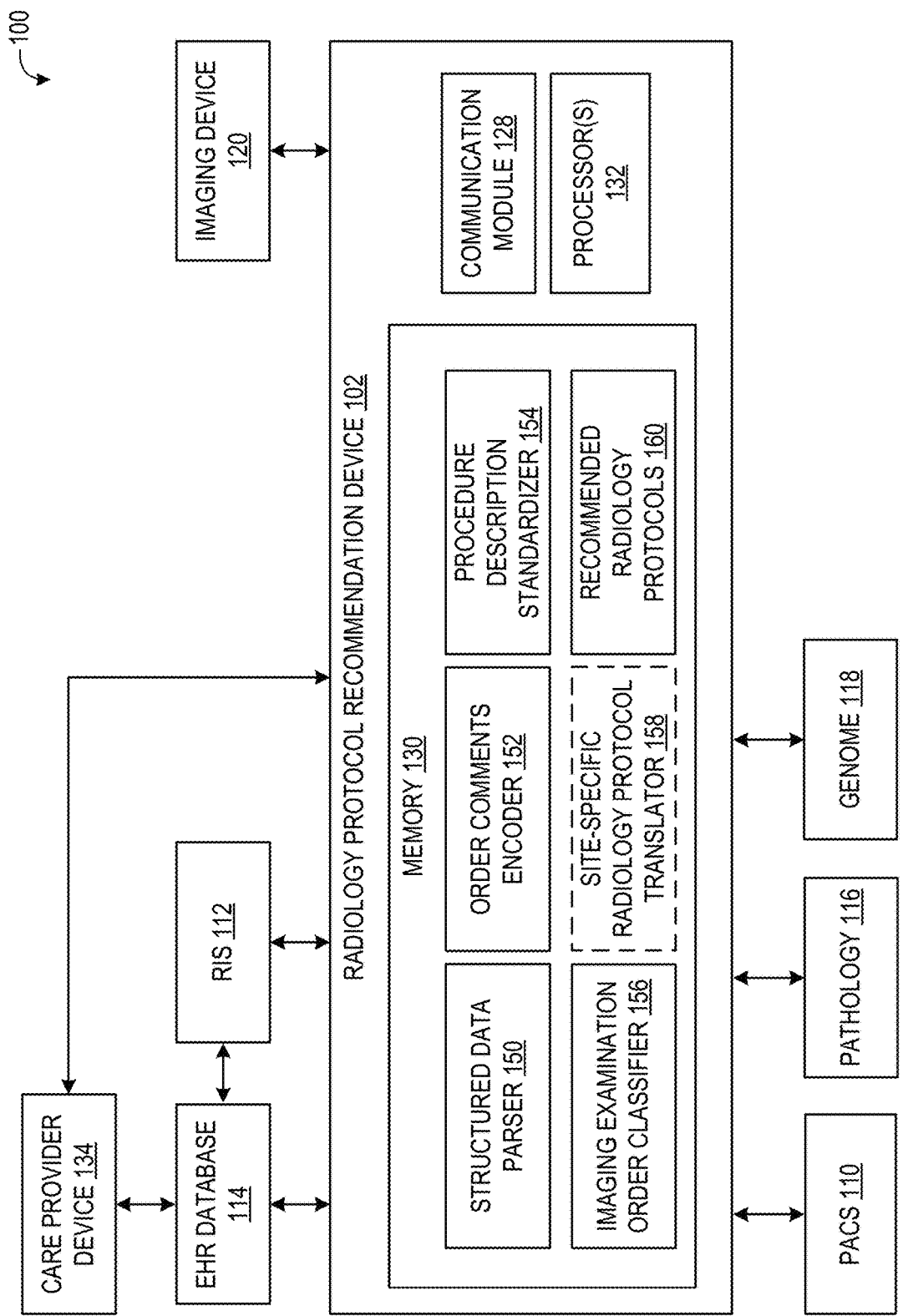
FIG. 1 illustrates a system for recommending radiology protocols based on imaging examination orders, in accordance with an aspect of the disclosure.

The following description relates to various methods and systems for automatically recommending a site-specific radiology protocol in response to an imaging examination request, wherein the imaging examination request includes both structural data and unstructured text. A doctor or other care provider may issue an imaging examination order requesting a diagnostic scan of a patient (herein referred to as an imaging examination), which may include a CT scan, a magnetic resonance imaging (MRI) scan, a position emission tomography (PET) scan, a single-photon emission computed tomography (SPECT) scan, or medical diagnostic scans in other imaging modalities known to those of skill in the art of medical imaging, including combinations thereof (e.g., multi-modality imaging systems, such as PET/CT, PET/MR or SPECT/CT imaging systems).

Conventionally a radiologist or medical imaging technologist would review the imaging examination request, as well as the patient's medical history, to refine the requested imaging examination to a more detailed imaging examination request (herein referred to as a radiology protocol) tailored specifically to the patient. The radiology protocol may then be passed on to an imaging technologist who may then select a machine level imaging protocol, which may be executed by an imaging device, to perform the requested scan. The above described conventional approach requires substantial person-hours, and may lead to a same imaging examination request being mapped to a different radiology protocol depending on which human radiologist reviewed the imaging examination order.

Thus, automating the process of mapping imaging examination orders to radiology protocols may substantially increase an efficiency and consistency of a medical imaging workflow. However, automation of radiology protocol selection is complicated by the variability of the contents and format of the imaging examination requests, as well as the site-by-site variability in format of the radiology protocols. As an example, a substantial component of imaging examination requests may be unstructured text, also referred to as free-text, or natural language, such as a listing of reasons for the imaging examination order (e.g., "surveillance after neoadjuvant chemoradiation for esophageal cancer. Preoperative evaluation"), or a non-radiologist description of the imaging examination to be performed (e.g., a doctor's high-level description of a desired diagnostic scan, such as "CT chest, WO contrast"). These unstructured textual components of the imaging examination order may be rich with information regarding the requested imaging examination, however, conversion of the unstructured text into a compact, machine-useable, form which captures the salient information of the original text, is challenging.

Further, different sites, such as different hospitals, may be equipped with different imaging devices, and/or imaging devices with different imaging capabilities. In addition, different sites may express radiology protocols in different formats and/or with different syntax. Thus, developing systems and methods for automating radiology protocol recommendation is complicated by the distinct radiology protocols and formats of expressing said radiology protocols that occur at different sites. As an example, at a first site, an imaging examination order for a patient may be satisfied by executing a first radiology protocol (e.g., by performing a diagnostic scan using a first imaging device). However, at a second hospital that lacks the imaging capability of the first hospital (e.g., the second hospital does not possess the first imaging device, but has an older imaging device with different, but similar imaging capabilities), the same imaging examination order for the same patient may be satisfied (at least approximately) using a second radiology protocol, which is not equivalent to the first imaging protocol. As an example, this may be due to how the imaging protocol is tuned based on the imaging capabilities of the device (i.e. system hardware and software configurations) in order to optimize image quality at the time of scan. Thus, in order to automate the radiology protocol selection at a particular site, the imaging capabilities at the site, as well as the radiology protocol format used at the site, may need to be accounted for, either explicitly or implicitly.

The inventors herein have developed systems and methods which at least partially address the above complications involved in automating radiology protocol recommendation. In one example, the current disclosure provides a method for automatically recommending a site-specific radiology protocol based on an imaging examination order, comprising, receiving the imaging examination order requesting an imaging examination (wherein the imaging examination order comprises structured data and unstructured text), converting the unstructured text into one or more feature vectors, mapping the structured data and the one or more feature vectors to a standardized radiology protocol representation using an imaging examination order classifier, and mapping the standardized radiology protocol representation to the site-specific radiology protocol using a site-specific radiology protocol translator. In this way, unstructured text may be leveraged along with structured data to predict an appropriate radiology protocol for a patient, for a given imaging examination order, by converting the unstructured text into one or more feature vectors. Further, the above approach uses a first machine learning model, the imaging examination order classifier, to map the imaging examination order to a site independent representation of a radiology protocol, herein referred to as a standardized radiology protocol representation. The standardized radiology protocol representation may then be mapped to a site-specific radiology protocol using the site-specific radiology protocol translator. Thus, by decoupling the functionalities of imaging examination order classification from site-specific translation of radiology protocols, a single imaging examination order classifier may be trained and deployed to serve multiple sites, even if said sites utilize different radiology protocols and/or use different formats for expressing said radiology protocols. Translation of the standardized radiology protocol representation to a site-specific radiology protocol may be performed by a lightweight site-specific radiology protocol translator, which may be trained in-situ at the deployed sites, e.g., by learning in real-time via online learning.

Figure 5:
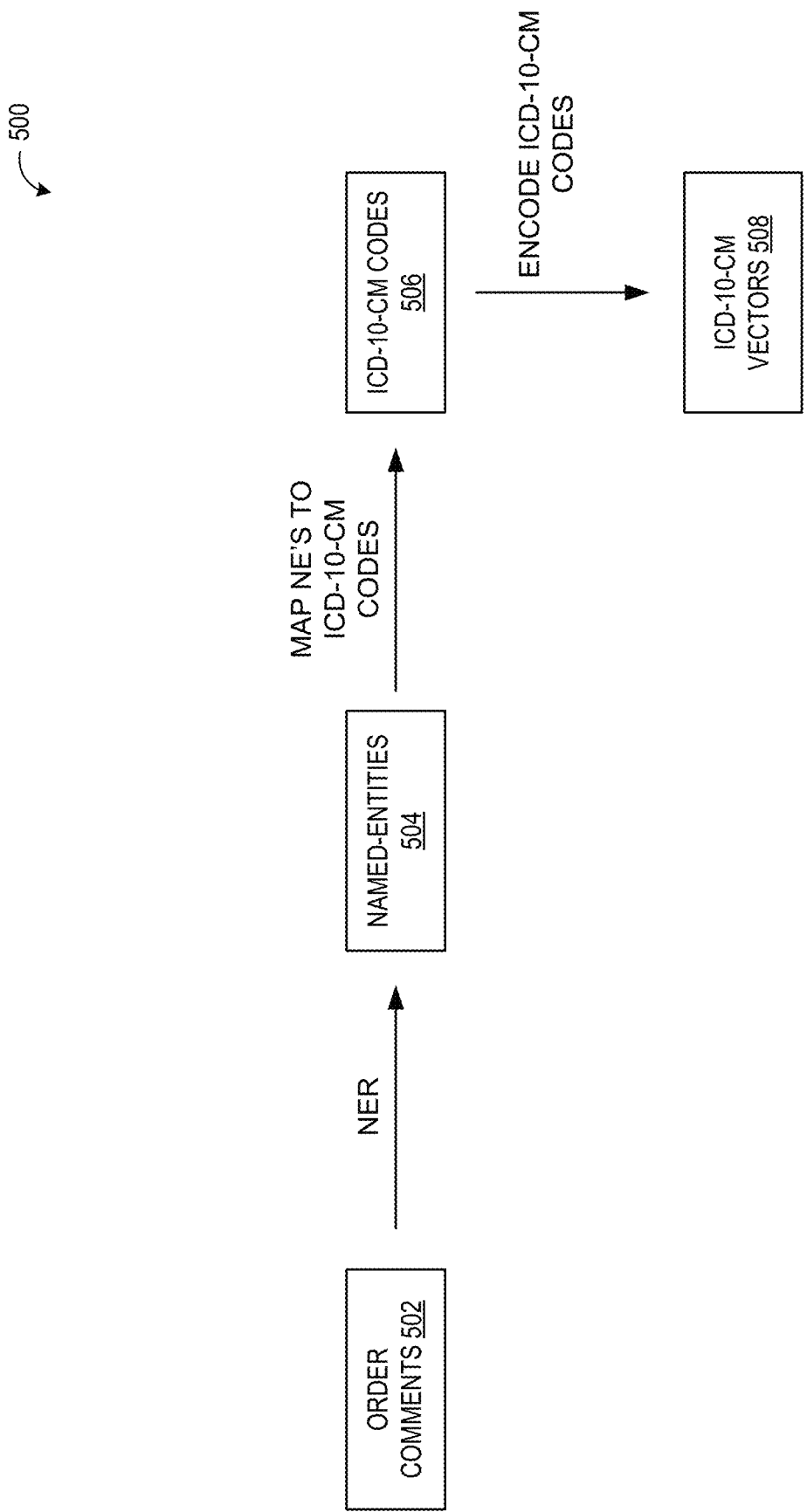
FIG. 5 shows a block diagram schematically illustrating a method of converting order comments included in an imaging examination order into one or more feature vectors, in accordance with an aspect of the disclosure.
Figure 6:
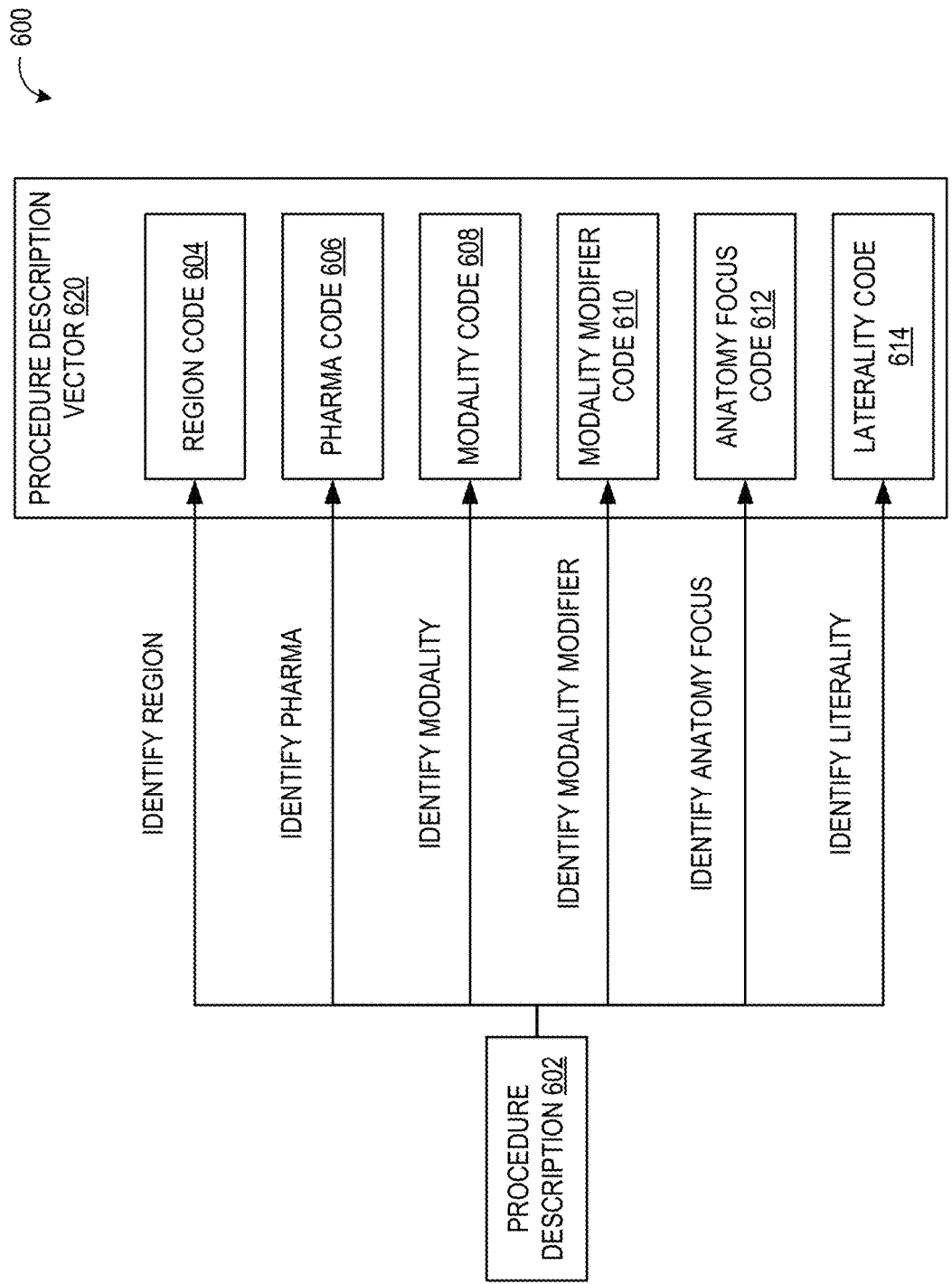
FIG. 6 shows a block diagram schematically illustrating a method of standardizing a procedure description included in an imaging examination order by converting the procedure description into one or more standardized codes, in accordance with an aspect of the disclosure.

The following detailed description, given in reference to the figures, discloses exemplary embodiments of systems and methods for automatically recommending radiology protocols based on imaging examination orders, using machine learning techniques. FIG. 1 illustrates one embodiment of a site-specific radiology protocol recommendation system 100, configured to receive imaging examination orders via one or more communicatively coupled care provider devices. The imaging examination order received by the site-specific radiology protocol recommendation system 100 may include both structured data, one example of which is shown by structured data 402 in FIG. 4, as well as unstructured text. FIG. 5 illustrates a process of converting unstructured text in the form of order comments 502 (e.g., reasons prompting the imaging examination order, doctor observations, patient indications, etc.) into one or more ICD-10-CM vectors 508, using an embedding model. One or more operations of method 900, shown in FIG. 9, may be used to convert the order comments into one or more feature vectors using an embedding model. Similarly, FIG. 6 illustrates a process by which the site-specific radiology protocol recommendation system 100 may standardize a procedure description 602 (e.g., a referring physician's high-level description of a desired diagnostic scan) by converting the procedure description into one or more numerical codes (e.g., numerical codes 604-614), by performing one or more operations of methods 1000A, 1000B, and 1000C, as shown in FIGS. 10A, 10B, and 10C, respectively.

Figure 2:
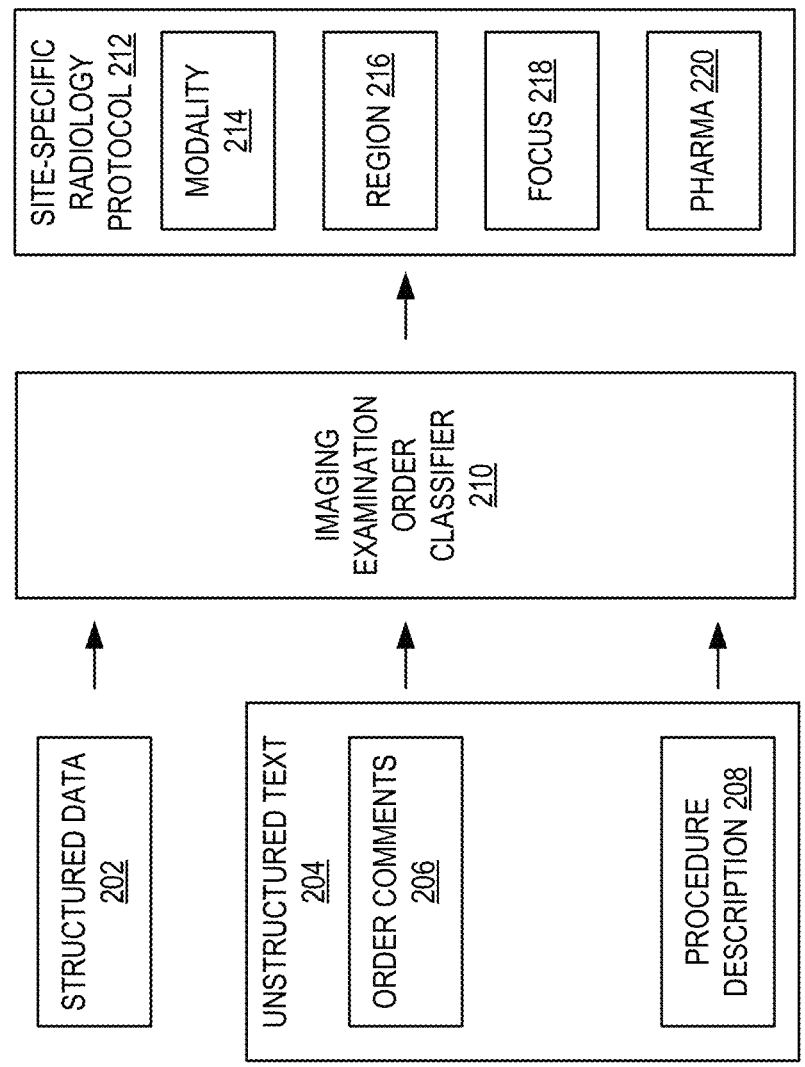
FIG. 2 shows a block diagram schematically illustrating a flow of data through a first embodiment of an imaging examination order classifier, in accordance with an aspect of the disclosure.
Figure 7:
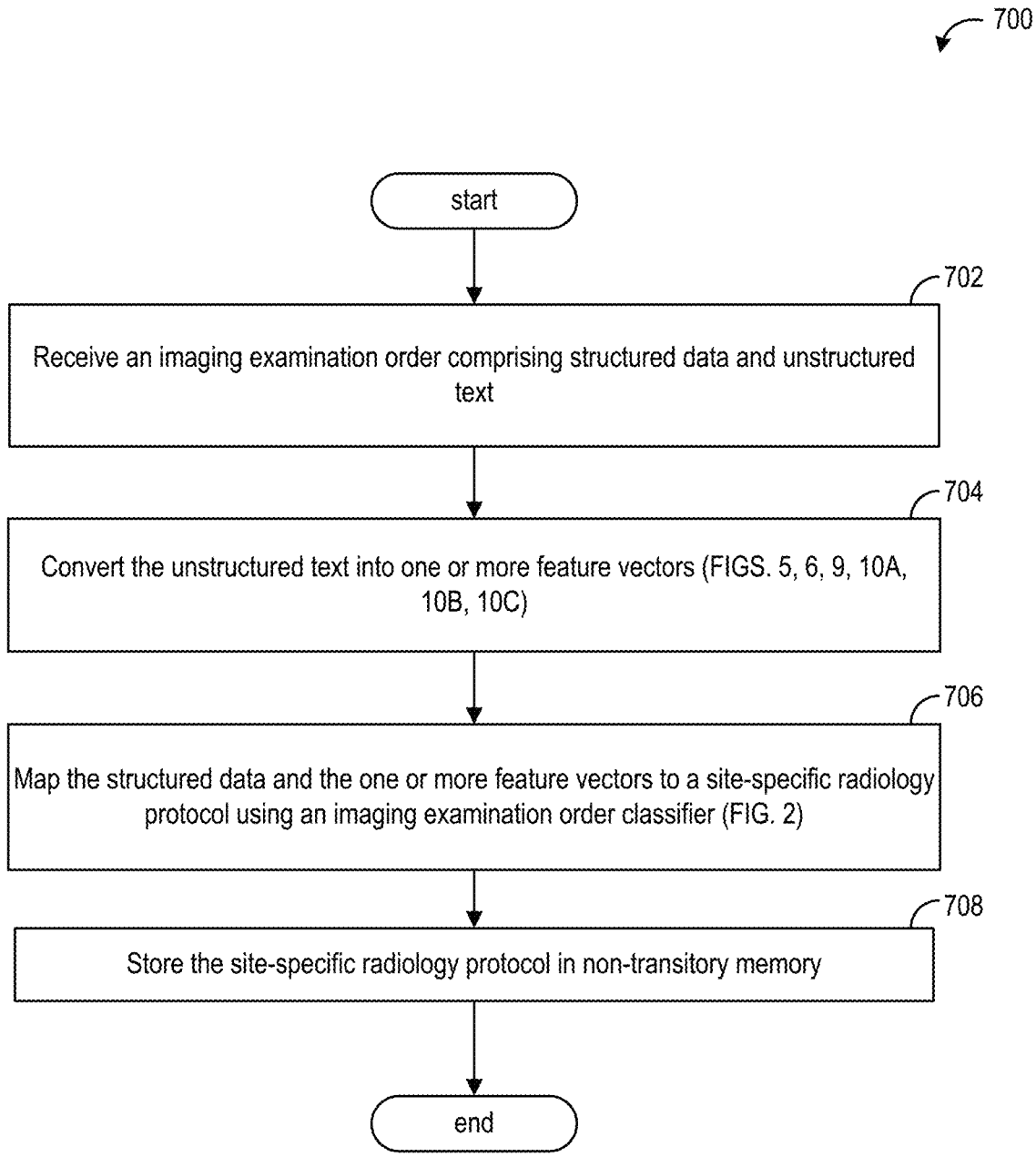
FIG. 7 shows a flowchart illustrating a first embodiment of a method for automatically recommending a site-specific radiology protocol based on an imaging examination order, using the first embodiment of the imaging examination order classifier shown in FIG. 2.

The site-specific radiology protocol recommendation system 100 may map the structured data and feature vectors derived from the unstructured text, directly to site-specific radiology protocols using an imaging examination order classifier 210, as shown in FIG. 2, by executing one or more operations of method 700, shown in FIG. 7. The imaging examination order classifier 210 may be trained by performing one or more operations of method 1100A, shown in FIG. 11A.

Figure 3:
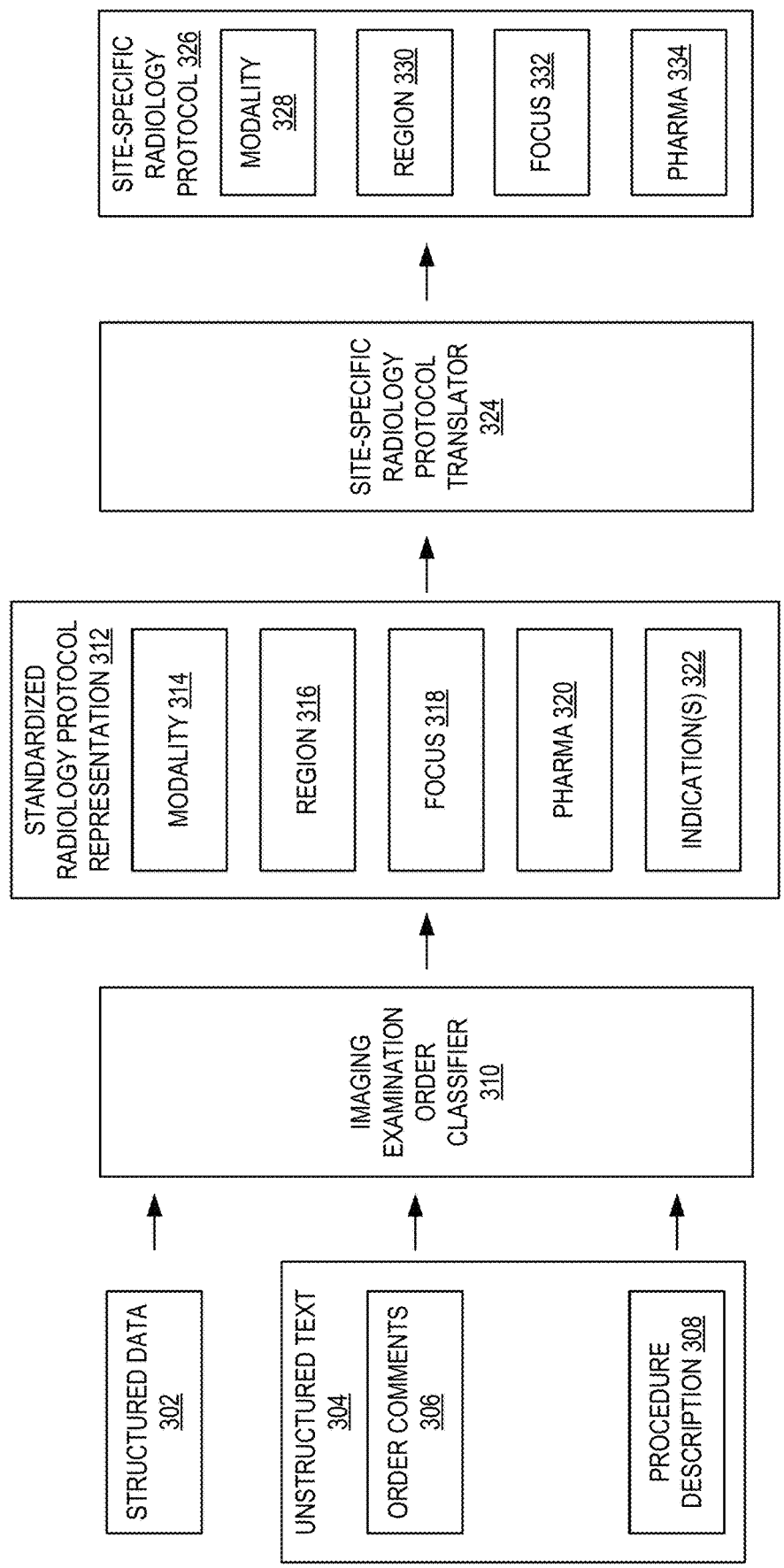
FIG. 3 shows a block diagram schematically illustrating a flow of data through a second embodiment of an imaging examination order classifier, and a site-specific radiology protocol translator, in accordance with an aspect of the disclosure.
Figure 8:
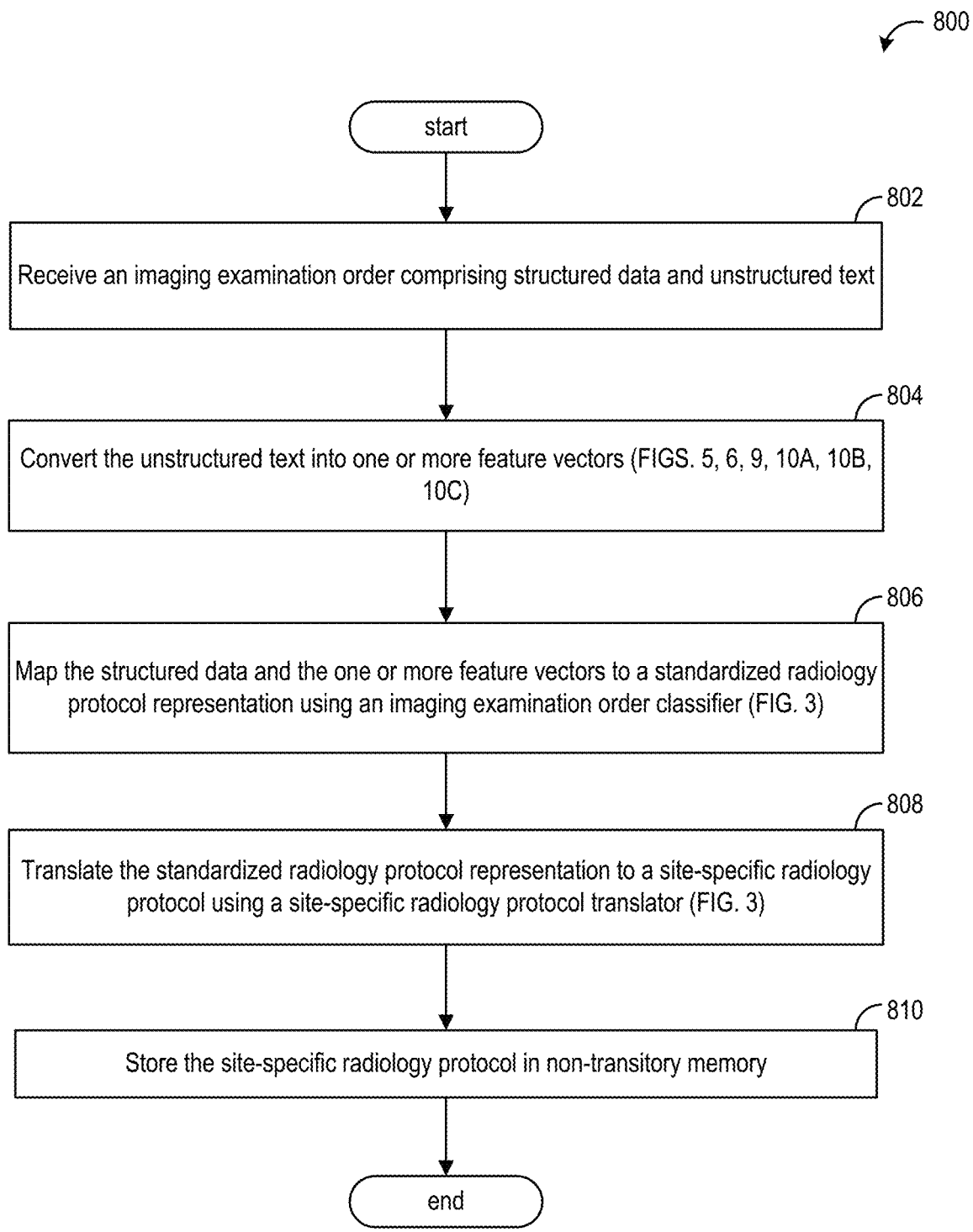
FIG. 8 shows a flowchart illustrating a second embodiment of a method for automatically recommending a site-specific radiology protocol based on an imaging examination order, using the second embodiment of the imaging examination order classifier shown in FIG. 3.

Alternatively, the site-specific radiology protocol recommendation system 100 may map the structured data and feature vectors derived from the unstructured text, to a standardized radiology protocol representation 312 using imaging examination order classifier 310, and then map the standardized radiology protocol representation 312 to a site-specific radiology protocol 326 using site-specific radiology protocol translator 324, as shown in FIG. 3, by executing one or more operations of method 800, shown in FIG. 8. The imaging examination order classifier 310 may be trained by performing one or more operations of method 1100B, shown in FIG. 11B, and the site-specific radiology protocol translator 324 may be separately or concurrently trained by performing one or more operations of method 1200, shown in FIG. 12.

Referring first to FIG. 1, an embodiment is shown of a site-specific radiology protocol recommendation system 100, that may be implemented at a site, such as a medical facility, hospital, or other location which performs medical imaging. Site-specific radiology protocol recommendation system 100 may include a radiology protocol recommendation device 102, communicatively coupled to a care provider device 134, an imaging device 120, and a plurality of medical data sources, including a picture archiving and communication system (PACS) 110, a radiology information system (RIS) 112, an electronic health record (EHR) database 114, a pathology database 116, and a genome database 118. The EHR database 114 may also be communicatively coupled to RIS 112 and care provider device 134.

Radiology protocol recommendation device 102 may include resources (e.g., memory 130 and processor(s) 132) that may be allocated to automatically recommend radiology protocols in response to receiving imaging examination orders either directly or indirectly from care provider device 134. For example, a physician may input an imaging examination order via care provider device 134, which may be transmitted from the care provider device 134 either directly to radiology protocol recommendation device 102 or may first be transmitted to EHR database 114, then to RIS 112, before being relayed to radiology protocol recommendation device 102. Upon receiving the imaging examination order, the radiology protocol recommendation device 102 may map the imaging examination order to a site-specific radiology protocol by performing one or more operations disclosed in methods 700 and 800, which may include parsing the imaging examination order to obtain structured data and/or unstructured text stored therein, as well as accessing patient data (which may also include both structured data and unstructured text) from one or more of PACS 110, RIS 112, EHR database 114, pathology database 116, and genome database 118, and assigning the imaging examination order to a site-specific radiology protocol based on the structured data and unstructured text. Once a site-specific radiology protocol has been determined for the imaging examination order, the radiology protocol recommendation device 102 may store the recommended radiology protocol in memory 130, such as at recommended radiology protocols 160 and/or the radiology protocol recommendation device 102 may transmit the recommended site-specific radiology protocol to one or more of the care provider device 134, the EHR database 114, RIS 112, and the imaging device 120.

Care provider device 134 may include a processor, memory, communication module, user input device, display (e.g., screen or monitor), and/or other subsystems and may be in the form of a desktop computing device, a laptop computing device, a tablet, a smart phone, or other device. Although a single care provider device 134 is shown in FIG. 1, it is to be appreciated that this is done for simplicity, and multiple health care provider devices may be included in site-specific radiology protocol recommendation system 100. Each care provider device may be adapted to send and receive encrypted data and display medical information, including imaging examination orders, in a suitable format such as health level seven (HL7) messages (e.g., HL7 v2 or HL7 v3), digital imaging and communications in medicine (DICOM), or other standards. The care provider devices may be located locally at the medical facility (such as in the room of a patient or a clinician's office) and/or remotely from the medical facility (such as a care provider's mobile device).

In some embodiments, a referring physician may enter an imaging examination order for a patient into an entry of EHR database 114 corresponding to the patient, via care provider device 134. The imaging examination order may include a study code, a procedure description (e.g., a high-level description of the requested imaging examination), reasons for the requested imaging examination, and answers to various questions pertaining to the requested imaging examination. The imaging examination order may in some embodiments be communicated from EHR database 114 to RIS 112 (and subsequently to radiology protocol recommendation device 102) via an HL7 v2 message. An example of an imaging examination request in the form of an HL7 v2 message is provided below: MSH|^~\&|Epic| SHC||| 20210408085800||ORM^O01|5878|T|2.5 PID|||10013431|| TESTING^RESARCH||19610101|M PV1|O|BLAKE-WCT^^^SHC BLAKE WILBURAAAAAAA ORC|NW| 300065032^EPC|TST17197549|||||||S052^^^110999^^^^^ DIAGNOSTIC RADIOLOGY SPLTY|||||BLAKEWCT^^^-SHC BLAKE WILBUR OBR|300065032^EPC| TST17197549|IMGCT0047^CT HEAD ANGIOGRAPHY W AND WO IV CONTRAST^EPIC||20210407|||||(408) 851-4010||These are order comments entered while placing the order ~||HEAD^CT NEURO|054827^SMITH^ALLISON^ J^^^^^SHC^^^^MSPV||TST17197549|||||CT|NW||^^^^R||||||| 20210408090000 OBX|1|ST|IRAD50^Iodine contrast allergy?|1|Unknown|||||F|||20210407083203|||||||||||||QST||| OBX|2|ST|IRAD96^Want immediate contact?|1|No||||F||| 20210407083203|||||||||||||QST|||OBX|3|ST|IRAD97^Exam modification OK?|1|Yes|||||F|||20210407083203||||||||||||| QST||| OBX|4|ST|IRAD31^Reason||Head trauma, mod-severe (Ped 0-18y)

In the above HL7 v2 message, the OBX-4 field includes the "reason for exam" (e.g., Head trauma, mod-severe (Ped 0-18y)) and the OBR-4 field includes the procedure description of the imaging examination being requested (CT HEAD ANGIOGRAPHY W AND WO IV CONTRAST). The above HL7 v2 message further includes other OBX fields that describe other imaging examination order related questions.

In response to receiving the imaging examination order, the radiology protocol recommendation device 102 parses and extracts information stored in the various fields of the imaging examination order, e.g., the "reason for exam" stored in the OBX-4 field, the procedure description stored in the OBR-4 field, the patient ID stored in the PID field, etc. In some embodiments, logic for parsing the fields of the imaging examination order may be stored in structured data parser 150. In some examples, the radiology protocol recommendation device 102 may employ a regex based pattern matcher to identify various fields included in an imaging examination order, and to extract the information included therein. It is to be appreciated that although data is included in a structured format, the data itself may be "unstructured", that is, may comprise free/unstructured text. As an example, an imaging examination order may be stored in a "structured" format defined by the HL7 v2 standards, such as in the example HL7 v2 message provided above, however data contained within the various fields of the HL7 v2 message may include unstructured text, such as the procedure description, the order comments, the reason for the exam, and the various medical questionnaire answers included in the OBX fields.

In some embodiments, upon receiving an imaging examination order, the radiology protocol recommendation device 102 may correlate patient information extracted from the imaging examination order with one or more additional sources of medical information/patient data. Patient data extracted from sources other than the imaging examination order may include patient demographic information, records of previous medical treatments undergone by the patient, radiology reports, and results of lab tests (e.g., blood tests, disease screenings, etc.), wherein the medical information/patient data may include structured data and/or unstructured text. Examples of unstructured text may include radiology reports, lab reports, clinical notes, etc., whereas examples of structured data may include continuous data (such as age, weight, height, lab results, etc.) or categorical data (such as imaging examination order priority, smoking history, sex, ordering department, etc.). Patient data may be transmitted to the radiology protocol recommendation device 102 via HL7, Fast Healthcare Interoperability Resources (FHIR), CCD, XCA, XDS, or other data communication protocols known in the art of medical information systems, in response to one or more requests for patient data transmitted from the radiology protocol recommendation device 102 to EHR database 114, PACS 110, RIS 112, pathology 116, and genome 118. As an example, the radiology protocol recommendation device 102 may correlate a patient name and/or patient ID included in the imaging examination order with patient demographic data stored in EHR database 114, and a radiology report from RIS 112.

The medical information systems shown in FIG. 1, from which patient data may be extracted based on correlation with patient information included in the imaging examination order, will now be described in more detail. PACS 110 may store medical images and associated meta-data, e.g., MRI, CT, X-ray, PET, SPECT, PET/CT, PET/MR or SPECT/CT or images in other modalities known in the art of medical imaging, along with scanner settings, clinician findings (which may comprise unstructured text), etc. In some embodiments, images stored in PACS 110 may be stored in a DICOM file format. RIS 112 may store radiology images and associated reports (which may be written in unstructured text), such as CT images, X-ray images, etc. EHR database 114 stores electronic medical records for a plurality of patients, which may include records of imaging examinations ordered for said patients listed in the EHR database 114. EHR database 114 may be stored in a mass storage device configured to communicate via secure channels (e.g., HTTPS and TLS), and store data in encrypted form. Further, the EHR database 114 is configured to control access to patient electronic medical records such that only authorized healthcare providers may edit and access the electronic medical records. Patient data stored in EHR database 114 may be structured (e.g., may comprise numerical and/or categorical values for patient attributes, stored in a standardized data structure, such as a table, list, or dictionary). In some embodiments, patient data stored in EHR database 114 may include patient demographic information, family medical history, patient medical history, lifestyle information, pre-existing medical conditions, current medications, allergies, surgical history, past medical screenings and procedures, past hospitalizations and visits, etc. Pathology database 116 may store pathology images and related reports, which may include visible light or fluorescence images of tissue, such as immunohistochemistry (IHC) images. Genome database 118 may store patient genotypes (e.g., of tumors) and/or other tested biomarkers.

In some embodiments, structured data obtained from sources other than the imaging examination order, such as those listed above, may be used to supplement structured data included in the imaging examination order (e.g., if a patient age is missing from the imaging examination order, but included in an EHR database 114 entry, the patient age may be extracted from the EHR database 114 entry and used to complete the demographic information for the patient), whereas unstructured text obtained from sources other than the imaging examination order may be concatenated with the unstructured text from the imaging examination order and processed together. It is to be understood that reference to structured data, herein, refers to structured data stored within the imaging examination order, as well as to structured data obtained from sources other than the imaging examination order based on correlation with patient information included in the imaging examination order, unless otherwise stated. Similarly, it is to be understood that reference to unstructured text, herein, refers to unstructured text stored within an imaging examination order, as well as to unstructured text obtained from sources other than the imaging examination order based on correlation with patient information included in the imaging examination order, unless otherwise stated.

Structured data parser 150 may receive the imaging examination order, and structured data obtained from other medical information systems, and produce an encoded vector of pre-determined size based on the numerical and/or categorical data included therein, wherein the vector produced by the structured data parser 150 is compatible for input into the imaging examination order classifier 156. Structured data parser 150 is configured to extract and encode categorical and/or numerical data which may be included in the imaging examination order, or obtained from other medical data sources, such as patient demographics (e.g., height, weight, age, BMI, sex, etc.), test results (e.g., positive or negative screening results, or a numerical value quantifying an analyte concentration, such as a troponin test, an AlC test, etc.). Structured data may comprise categorical and/or numerical data organized within a standardized data format or data structure, e.g., a table, a database, a dictionary, JSON, an HV7 message, a header of a DICOM file, etc. The structured data parser 150 may include instructions for parsing said standardized data formats and data structures, and may further include a regex based pattern matcher for identifying one or more pre-determined patterns within a string, e.g., the regex pattern \d\d\/\d\d\/\d\d\d\d may be used to match and extract date-of-birth information for a patient in formats such as "Dec. 12, 2020" from within larger strings.

Further, structured data parser 150 is configured to encode the identified numerical or categorical data into a format readable by imaging examination order classifier 156. In some embodiments, categorical data may be encoded by a numerical value corresponding to the identified category. As an example, if a patient sex of "Male" is identified by the structured data parser 150, an encoding value of 1 may be used, whereas if the patient sex is identified as "Female", an encoding value of 2 may be used. For numerical values, such as height, weight, etc., which may already be in a numerical form, the structured data parser 150 may use the numerical value directly, e.g., for a weight of "198 lbs" the structured data parser 150 may encode this weight as an integer or floating point value of "198". Once encoded, the structured data parser 150 may assemble a vector of the encoded numerical and categorical data, in a pre-determined order, and of a pre-determined length/size. In some embodiments, missing values may be imputed using a median or mean value (for numerical values) or a mode value (for categorical features). As an example, if the height of a patient is not identified by the structured data parser, an average height of 5 ft 9 in (encoded as a floating point value of 5.75) may be used. In another example, if a sex of a patient is missing from the structured data, a default category of 0 may be used, wherein 0 denotes a category separate from male (denoted by the integer 1) and female (denoted by the integer 2). The vector of encoded categorical and numerical patient data produced by structured data parser 150 may be combined with feature vectors produced by one or both of order comments encoder 152, and procedure description standardizer 154, before being fed to imaging examination order classifier 156, as will be described in more detail below.

Order comments encoder 152 may receive unstructured text, extracted from the imaging examination order, or from other medical information systems such as EHR database 114, PACS 110, RIS 112, pathology 116, and genome 118, and produce one or more feature vectors therefrom. The feature vectors produced by order comments encoder 152 may be concatenated with the vector of encoded numerical and categorical data produced by the structured data parser 150, and/or the standardized and encoded procedure description produced by the procedure description standardizer 154. Unstructured text received by order comments encoder 152 may include reasons for the imaging examination included in the imaging examination order (e.g., patient indications prompting the request of the imaging examination), order comments (e.g., a free-text description of observations or notes produced by a referring clinician input during generation of the imaging examination order), answers to a medical questionnaire included in the imaging examination order form (such as those provided in the example HL7 v2 message, shown above), clinical notes obtained from sources of medical information other than the imaging examination order, patient allergies, patient Glomerular Filtration Rate/Creatinine Value, previous radiology reports, free-text descriptions of patient medical history, etc. Thus, the amount/length of unstructured text received by order comments encoder 152 may be variable. Order comments encoder 152 may separately produce feature vectors for each "document", or string of unstructured text, received and combine the feature vectors once all documents have been processed. As an example, a first plurality of feature vectors may be produced for a first string of unstructured text included in an imaging examination order (e.g., reasons for exam, such as "63 years of age, Female, h/o stage IV renal cell cancer, serial scan to evaluate possible mets.") and a second plurality of feature vectors may be produced for a second string of unstructured text, also included in the imaging examination order (e.g., answers to a medical questionnaire). The first plurality of feature vectors and the second plurality of feature vectors may be combined before being fed to the imaging examination order classifier 156.

The order comments encoder 152 may include one or more tokenizers configured to convert a string of unstructured text into a sequence of tokens, one or more embedding models configured to convert a sequence of tokens into a corresponding sequence of embedding vectors, and one or more named-entity recognition (NER) models configured to convert a sequence of embedding vectors into a list of identified named-entities (NEs). Further, order comments encoder 152 may include logic for mapping named-entities to standardized medical designations, such as ICD-10-CM codes. As an example, a named-entity for a disease may be matched by the order comments encoder 152 to a corresponding ICD-10-CM code, e.g., a named-entity of "upper respiratory infection" identified in a "reasons for exam" field of an imaging examination order may be mapped to an ICD-10-CM code of J09.X2. In some embodiments, semantic similarity of the named-entity with the ICD-10-CM code descriptions may be determined based on a cosine similarity of the embedding vectors representing the named-entity and each of the ICD-10-CM codes. The order comments encoder 152 may be further configured to convert the standardized medical designations, such as the ICD-10-CM codes, into a vector representation, which may then be fed to the imaging examination order classifier 156. In some embodiments, the order comments encoder 152 may be configured to encode the ICD-10-CM codes into a vector using one-hot encoding, character level encoding, or frequency encoding.

The procedure description standardizer 154 is configured to receive a procedure description, extracted from the imaging examination order, and produce a standardized numerical representation of the content of the procedure description which may be fed to the imaging examination order classifier 156, e.g., by mapping portions of the procedure description to standardized codes, and producing a feature vector representation from the standardized codes. Procedure descriptions are composed of unstructured text, however an extent of variability of the text within a procedure description may be less than the extent of variability in more free-form text, such as patient indications (such as may be recorded in a "reasons for exam" field of the imaging examination order) or clinician notes regarding a patient's medical history. As an example, a same imaging examination may be described by different referring physicians as "CT CHEST WO CONTRAST", "Chest CT WO CONTRAST", and "CT WO CONTRAST Chest", each procedure description includes the same information, however variability in syntax makes systematically and consistently parsing the procedure description non-trivial. The inventors herein have determined that components of procedure descriptions may be grouped into a finite number of description categories, which may include a body region to examine during the imaging examination (e.g., "chest"), an anatomical focus within the body region (e.g., "lungs), an imaging modality to employ for the imaging examination (e.g., "MRI"), a modality modifier to apply to the imaging modality (e.g., "T1 weighted"), a pharmacological treatment to apply prior to the imaging examination (e.g., "IV contrast"), and a laterality of the imaging examination (e.g., "left"). In the above example, all three procedure descriptions include a body region (chest), an imaging modality (CT), and a pharmacological treatment to apply prior to the imaging examination (WO CONTRAST). It will be appreciated that not all procedure descriptions include components in each description category.

In a first embodiment, the procedure description standardizer 154 includes a pattern matcher (e.g., a regex based pattern matcher), and a search pattern repository including one or more search patterns for each of the pre-determined number of description categories, wherein each search pattern stored in the search pattern repository includes a mapping to a corresponding standardized code (see FIG. 10A, below, for a more detailed description). In a second embodiment, the procedure description standardizer 154 includes at least a plurality of multi-class classifiers, at least one multi-class classifier for each of the pre-determined number of description categories, wherein the procedure description may be fed to each of the plurality of multi-class classifiers, and mapped to a corresponding plurality of standardized codes using the plurality of multi-class classifiers (see FIG. 10B, below, for a more detailed description). In a third embodiment, the procedure description standardizer 154 may include, for each of the pre-determined number of description categories, a plurality of binary classifiers (e.g., one binary classifier for each possible code within the respective description category). As an example, the procedure description standardizer may include, for the description category of "body region", one binary classifier for each distinct body region (e.g., one binary classifier for head/not head, one binary classifier for chest/not chest, etc.). Outputs from the plurality of binary classifiers for each respective description category may be reconciled to produce a standardized code in said respective description category (see FIG. 10C, below, for a more detailed description). The standardized codes produced for one or more of the pre-determined number of description categories may be combined into a feature vector, and may be combined with feature vectors produced by one or both of structured data parser 150, and order comments encoder 152, before being fed to imaging examination order classifier 156.

Feature vectors from the structured data parser 150, the order comments encoder 152, and the procedure description standardizer 154, may be fed to the imaging examination order classifier 156. In a first embodiment (illustrated in FIG. 2), the imaging examination order classifier 156 is configured to map the combined feature vectors to a site-specific radiology protocol, which may be stored in recommended radiology protocols 160, and/or transmitted to one or more devices communicatively coupled to the radiology protocol recommendation device 102. In a second embodiment (illustrated in FIG. 3), the imaging examination order classifier 156 is configured to map the combined feature vectors to a standardized radiology protocol representation, which may subsequently be translated to a site-specific radiology protocol via site-specific radiology protocol translator 158, which may be stored in memory 130 at recommended radiology protocols 160, and/or transmitted to one or more devices communicatively coupled to the radiology protocol recommendation device 102.

The imaging examination order classifier 156 may comprise one or more machine learning models, including but not limited to, support vector machines (SVMs), neural networks (NNs) including long short-term memory (LSTM) networks and recurrent neural networks (RNNs), tree-based classifiers including XGBoost, Light GBM, and Random Forest classifiers. In some embodiments, the imaging examination order classifier 156 may include a multi-class classifier for each of a plurality of outputs composing a standardized radiology protocol representation and/or a sit-specific radiology protocol, wherein, in one example, outputs may include an imaging modality to employ for the imaging examination, a body region to examine during the imaging examination, an anatomical focus within the body region, a pharmacological treatment to apply prior to the imaging examination, and patient indications. In some embodiments, output from the imaging examination order classifier 156 may comprise a site-specific radiology protocol, in such embodiments, the output of the imaging examination order classifier may be stored in memory 130 at recommended radiology protocols 160, and/or transmitted to one or more of the imaging device 120 (e.g., to be reviewed by a technologist and/or executed by the imaging device), the care provider device 134 (e.g., to be reviewed/approved by the referring physician), RIS 112 (e.g., for centralized storage and future access by care provider devices and/or imaging devices), EHR database 114 (e.g., for storage in a patient record, which may be referenced utilized accessed and utilized in response to future imaging examination orders to automatically recommend radiology protocols).

In embodiments in which the imaging examination order classifier 156 maps the combined feature vectors to a standardized radiology protocol representation, site-specific radiology protocol translator 158 may be used to translate the site-independent standardized radiology protocol representation to a site-specific radiology protocol (e.g., which may be easily understood by care providers at the site and/or directly mapped to imaging protocols within RIS 112). In some embodiments, the standardized radiology protocol representation may comprise a vector of category classifications in each of a plurality of radiology protocol categories, e.g., a category classification for each of the categories of: an imaging modality to employ for the imaging examination; a body region to examine during the imaging examination; an anatomical focus within the body region to examine during the imaging examination; and a pharmacological treatment to apply prior to the imaging examination. In some embodiments, the site-specific radiology protocol translator 158 may comprise a machine learning model, configured to receive the standardized radiology protocol representation as input, and map the standardized radiology protocol representation to a site-specific radiology protocol. In some embodiments, the site-specific radiology protocol translator may comprise a dictionary or lookup table, wherein vector entries of the standardized radiology protocol representation may act as keys (or queries) which efficiently map to corresponding values from the dictionary or lookup table, wherein the values correspond to the site-specific representations of each category classification in the standardized radiology protocol representation. In some embodiments, the site-specific radiology protocol translator may map the standardized radiology protocol representation to a single value, corresponding to a unique radiology protocol stored in RIS 112.

Radiology protocol recommendation device 102 further includes a communication module 128, memory 130, and processor(s) 132 to store and generate the radiology protocols, as well as send and receive communications, graphical user interfaces, medical data, and other information. Communication module 128 facilitates transmission of electronic data within and/or among one or more systems. Communication via communication module 128 can be implemented using one or more protocols. In some examples, communication via communication module 128 occurs according to one or more standards (e.g., Digital Imaging and Communications in Medicine (DICOM), Health Level Seven (HL7), ANSI X12N, etc.). Communication module 128 can be a wired interface (e.g., a data bus, a Universal Serial Bus (USB) connection, etc.) and/or a wireless interface (e.g., radio frequency, infrared, near field communication (NFC), etc.). For example, communication module 128 may communicate via wired local area network (LAN), wireless LAN, wide area network (WAN), etc. using any past, present, or future communication protocol (e.g., BLUETOOTH™, USB 2.0, USB 3.0, etc.).

Memory 130 one or more data storage structures, such as optical memory devices, magnetic memory devices, or solid-state memory devices, for storing programs and routines executed by processor(s) 132 to carry out various functionalities disclosed herein. Memory 130 may include any desired type of volatile and/or non-volatile memory such as, for example, static random access memory (SRAM), dynamic random access memory (DRAM), flash memory, read-only memory (ROM), etc. Processor(s) 132 may be any suitable processor, processing unit, or microprocessor, for example. Processor(s) 132 may be a multi-processor system, and, thus, may include one or more additional processors that are identical or similar to each other and that are communicatively coupled via an inter-connection bus.

As used herein, the terms "sensor," "system," "unit," or "module" may include a hardware and/or software system that operates to perform one or more functions. For example, a sensor, module, unit, or system may include a computer processor, controller, or other logic-based device that performs operations based on instructions stored on a tangible and non-transitory computer readable storage medium, such as a computer memory. Alternatively, a sensor, module, unit, or system may include a hard-wired device that performs operations based on hard-wired logic of the device. Various modules or units shown in the attached figures may represent the hardware that operates based on software or hard-wired instructions, the software that directs hardware to perform the operations, or a combination thereof.

"Systems," "units," "sensors," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

One or more of the devices described herein may be implemented over a cloud or other computer network. For radiology protocol recommendation device 102 is shown in FIG. 1 as constituting a single entity, but it is to be understood that radiology protocol recommendation device 102 may be distributed across multiple devices, such as across multiple servers. Further, while the elements of FIG. 1 are shown as being housed at a single medical facility, it is to be appreciated that any of the components described herein (e.g., EHR database, RIS, PACS, etc.) may be located off-site or remote from the radiology protocol recommendation device 102. Further, the longitudinal data utilized by the radiology protocol recommendation device 102 for automatic recommendation of radiology protocols and other tasks described below may come from systems within the medical facility or obtained through electronic means (e.g., over a network) from other referring institutions.

While not specifically shown in FIG. 1, additional devices described herein (e.g., care provider device 134) may likewise include user input devices, memory, processors, and communication modules/interfaces similar to communication module 128, memory 130, and processor(s) 132 described above, and thus the description of communication module 128, memory 130, and processor(s) 132 likewise applies to the other devices described herein. As an example, care provider devices (e.g., care provider device 134) may include instructions stored in non-transitory memory, that when executed by a processor of the care provider device are configured to display patient information, imaging examination order forms (with selectable interface elements enabling a user to input various pieces of information as part of completion of an imaging examination order), recommended radiology protocols produced in response to an imaging examination order, etc. The user input devices may include keyboards, mice, touch screens, microphones, or other suitable devices.

Referring to FIG. 2, a block diagram 200 schematically illustrating a flow of data through a first embodiment of an imaging examination order classifier 210 is shown. The imaging examination order classifier 210 is configured to map both structured data 202 and unstructured text 204, which may be extracted from an imaging examination order and/or obtained from other medical data sources based on patient information included in the imaging examination order, to a site-specific radiology protocol 212. The imaging examination order classifier 210 may automatically determine a site-specific radiology protocol recommendation, without use of a site-specific radiology protocol translator, by performing one or more of the operations of method 700, described below with reference to FIG. 7. Further, imaging examination order classifier 210 may be trained to learn a mapping from structured data and unstructured text, directly to site-specific radiology protocols, by performing one or more operations described in training method 1100A, shown in FIG. 11A. In some embodiments, imaging examination order classifier 210 may be trained in-situ, that is, at a deployment site such as a hospital or other facility equipped to perform medical imaging.

The imaging examination order classifier 210 may be configured to receive a first feature vector generated from structured data 202 (e.g., via encoding of numerical and categorical data comprising the structured data 202 as described in more detail above with reference to FIG. 1, and below with reference to FIG. 4), a second feature vector (or plurality of feature vectors) generated by identifying and encoding named-entities within order comments 206 or other unstructured text extracted from the imaging examination order and/or patient medical records (as described in more detail below, with reference to FIGS. 5 and 9), and a third feature vector generated by mapping portions of a procedure description 208 included in the imaging examination order to standardized codes in a pre-determined number of description categories (as described in more detail below, with reference to FIGS. 6, 10A, 10B, and 10C).

The imaging examination order classifier 210 may comprise one or more machine learning models, including but not limited to, support vector machines (SVMs), neural networks (NNs) including long short-term memory (LSTM) networks and recurrent neural networks (RNNs), tree-based classifiers including XGBoost, Light GBM, and Random Forest classifiers. In some embodiments, the imaging examination order classifier 210 may include a multi-class classifier for each of a plurality of outputs composing site-specific radiology protocol 212, wherein, in one example, outputs may include an imaging modality 214 to employ for the imaging examination, a body region 216 to examine during the imaging examination, an anatomical focus 218 within the body region, and a pharmacological treatment 220 to apply prior to the imaging examination.

In another embodiment, the imaging examination order classifier 210 may comprise a single multi-class classifier, wherein each "class" corresponds, or maps, to a particular site-specific radiology protocol 212, e.g., the output of the imaging examination order classifier 210 may comprise a prediction of a most probable class to which the structured data 202 and unstructured text 204 belong, and the class may map to a site-specific radiology protocol (including imaging modality 214, body region 216, anatomical focus 218, and pharmacological treatment 220) such as may be stored in an RIS of the site at which imaging examination order classifier 210 is being utilized (herein after referred to as the deployment site). As an example, the imaging examination order classifier 210 may map the first, second, and third feature vectors, generated from the structured data 202, the order comments 206, and the procedure description 208, respectively, to a classification vector, having a vector of length N, wherein N is a positive integer greater than one, and wherein N is equal to a number of distinct radiology protocols at the deployment site. A value in each of the N rows of the classification vector may indicate a probability of the currently evaluated imaging examination order being satisfied by the site-specific radiology protocol corresponding to the row.

Referring to FIG. 3, a block diagram 300 schematically illustrating a flow of data through a second embodiment of an imaging examination order classifier 310 is shown. The imaging examination order classifier 310 is configured to map both structured data 302 and unstructured text 304, which may be extracted from an imaging examination order and/or obtained from other medical data sources based on patient information included in the imaging examination order, to a site-independent standardized radiology protocol representation 312. The standardized radiology protocol representation 312 may subsequently be translated to a site-specific radiology protocol 326 by site-specific radiology protocol translator 324. The imaging examination order classifier 310 in conjunction with the site-specific radiology protocol translator 324, may automatically determine a site-specific radiology protocol recommendation 326 in response to receiving an imaging examination order, by performing one or more of the operations of method 800, described below with reference to FIG. 8. Further, imaging examination order classifier 310 may be trained to learn a mapping from structured data and unstructured text, to standardized radiology protocol representations, by performing one or more operations described in training method 1100B, shown in FIG. 11B. Similarly, the site-specific radiology protocol translator 324 may learn to map standardized radiology protocol representations to site-specific radiology protocols, by performing one or more operations of method 1200, shown in FIG. 12. In some embodiments, the imaging examination order classifier 310 may be pre-trained using data from a plurality of sites, and the site-specific radiology protocol translator 324 may be trained in-situ via online learning (that is, in substantially real-time, at a deployment site such as a hospital or other facility equipped to perform medical imaging). By uncoupling the imaging examination order classifier 310 from the site-specific radiology protocol translator 324, a single imaging examination order classifier 310 may be pre-trained and serve multiple sites without re-training at each site, whereas the site-specific radiology protocol translator 324 may be trained locally (e.g., at a particular hospital or healthcare network), thus improving the scalability of the automatic radiology protocol recommendation system.

The imaging examination order classifier 310 may be configured to receive a first feature vector generated from structured data 302 (e.g., via encoding of numerical and categorical data comprising the structured data 302 as described in more detail above with reference to FIG. 1, and below with reference to FIG. 4), a second feature vector (or plurality of feature vectors) generated by identifying and encoding named-entities within order comments 306 or other unstructured text extracted from the imaging examination order and/or patient medical records (as described in more detail below, with reference to FIGS. 5 and 9), and a third feature vector generated by mapping portions of a procedure description 308 included in the imaging examination order to standardized codes in a pre-determined number of description categories (as described in more detail below, with reference to FIGS. 6, 10A, 10B, and 10C).

The imaging examination order classifier 310 may comprise one or more machine learning models, including but not limited to, support vector machines (SVMs), neural networks (NNs) including long short-term memory (LSTM) networks and recurrent neural networks (RNNs), tree-based classifiers including XGBoost, Light GBM, and Random Forest classifiers. In some embodiments, the imaging examination order classifier 310 may include a multi-class classifier for each of a plurality of attributes composing the standardized radiology protocol representation 312, wherein, in one example, attributes may include an imaging modality 314 to employ for the imaging examination, a body region 316 to examine during the imaging examination, an anatomical focus 318 within the body region, a pharmacological treatment 320 to apply prior to the imaging examination, and patient indication(s) 322 (which may, in some embodiments, comprise vector representations of ICD-10-CM codes).

In another embodiment, the imaging examination order classifier 310 may comprise a single multi-class classifier, wherein each "class" corresponds, or maps, to a particular standardized radiology protocol representation, e.g., the output of the imaging examination order classifier 310 may comprise a prediction of a most probable class to which the structured data 302 and unstructured text 304 belong, and the class may map to a standardized radiology protocol representation (including imaging modality 314, body region 316, anatomical focus 318, pharmacological treatment 320, and patient indication(s) 322). As an example, the imaging examination order classifier 310 may map the first, second, and third feature vectors, generated from the structured data 302, the order comments 306, and the procedure description 308, respectively, to a classification vector, having a vector of length N, wherein N is a positive integer greater than one, and wherein N is equal to a number of distinct standardized radiology protocol representations. A value in each of the N rows of the classification vector may indicate a probability of the currently evaluated imaging examination order being satisfied by the standardized radiology protocol representation.

The standardized radiology protocol representation 312 may be translated to a site-specific radiology protocol 326, by the site-specific radiology protocol translator 324. The site-specific radiology protocol 326 may be more easily understood by care providers at the site and/or directly mapped to imaging protocols within an RIS at the deployment site. The standardized radiology protocol representation 312 comprises a vector of attributes or category classifications, including imaging modality 314, body region 316, anatomical focus 318, pharmacological treatment 320, and patient indication(s) 322. In some embodiments, the site-specific radiology protocol translator 324 may comprise a multi-class classifier, configured to receive the standardized radiology protocol representation 312 as input, and map the standardized radiology protocol representation 312 to the site-specific radiology protocol 326 (e.g., via a classification vector, wherein each row of the classification vector corresponds to a distinct site-specific radiology protocol).

In some embodiments, the site-specific radiology protocol translator 324 may comprise a dictionary or lookup table, wherein attributes of the standardized radiology protocol representation 312 may act as keys which efficiently map to corresponding values from the dictionary or lookup table, wherein the values correspond to the site-specific translations of the attributes of the standardized radiology protocol representation 312. In this way, each of imaging modality 314, body region 316, anatomical focus 318, and pharmacological treatment 320, may be independently mapped to site-specific equivalent expressions, e.g., imaging modality 328, body region 330, anatomical focus 332, and pharmacological treatment 334, respectively. As an example, site-specific radiology protocol translator 324 may map modality 314 of the standardized radiology protocol representation 312 to modality 328 of the site-specific radiology protocol 326, by using modality 314 as a key to look-up an equivalent site-specific expression indexed by said key.

Figure 4:
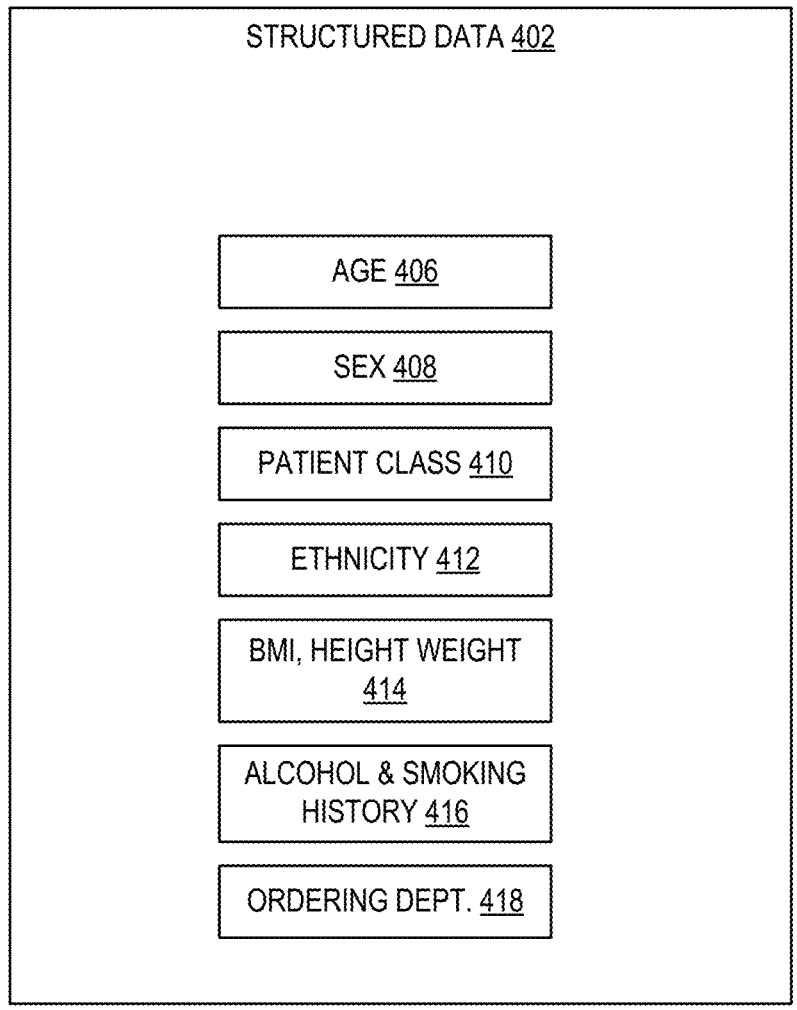
FIG. 4 shows an example of medical information pertaining to a patient which may be included in structured data of an imaging examination order, or access from an electronic health record database, in accordance with an aspect of the disclosure.

Referring to FIG. 4, an embodiment of structured data 402, which may be used in conjunction with unstructured text to automatically recommend a radiology protocol for an imaging examination order, is shown. In some embodiments, a radiology protocol recommendation system may receive structured data 402 as part of, or within, an imaging examination order. However, in some embodiments, the radiology protocol recommendation device may obtain structured data 402 by correlating patient information included in an imaging examination order (e.g., a patient name and age, a patient ID, etc.) with patient medical records stored in medical data systems such as an EHR database, an RIS, or other hospital information systems (HIS). In some embodiments, structured data 402 may comprise patient demographic data, stored as meta data of a medical image, such as in a DICOM header of a DICOM formatted medical image, or as data included as part of a previous medical exam. Structured data 402 includes, patient age 406, patient sex 408, patient class 410 (e.g., an expediency class for the requested imaging examination such as "STAT", "Routine", "Expedite", and "ASAP"), patient ethnicity 412, patient body-mass index (BMI), height and weight 414, alcohol & smoking history 416, and ordering department 418 (e.g., the department within the medical facility from which the imaging examination order originated). Structured data 402 comprises numerical data (patient age 406, patient BMI, height and weight 414) as well as categorical data (patient sex 408, patient class 410, ethnicity 412, alcohol & smoking history 416, and ordering department 418). Structured data 402 may be efficiently converted into a numerical representation (e.g., a feature vector) and used as input into an imaging examination order classifier. As an example, a feature vector representing structured data 402 may be generated by inserting patient age 406 (which comprises a numerical value) into a first row of the feature vector, converting the categorical value of patient sex 408 into a numerical equivalent (e.g., by mapping "Male" or "M" to a corresponding numerical value, such as an integer value of one) and placing this numerical equivalent of patient sex 408 into a second row of the feature vector, and so on, until a feature vector is generated comprising seven rows, once row for each of patient age 406, patient sex 408, patient class 410, patient ethnicity 412, patient BMI, height and weight 414, alcohol & smoking history 416, and ordering department 418. The feature vector generated from structured data 402 may be combined with one or more feature vectors generated from unstructured text, as will be described in more detail below.

Referring to FIG. 5, a process 500 for converting unstructured text, such as order comments 502, into feature vectors in the form of ICD-10-CM vectors 508, is shown. Process 500 may be performed by a radiology protocol recommendation system, in response to receiving an imaging examination order, e.g., as part of a conversion of unstructured text into a form usable by an imaging examination order classifier. The feature vectors produced by process 500 may be combined with feature vectors produced from structured data, as well as feature vectors produced from a procedure description, and the combined feature vectors may be used as input into an imaging examination order classifier as part of an automatic radiology protocol recommendation. Although ICD-10-CM codes are shown in FIG. 5, it will be appreciated that other standardized medical codes, may be used, including but not limited to, SNOMED, CPT, RxNorm, and RADLEX.

Order comments 502 may include a string of unstructured text, other than the procedure description, such as reasons for the exam included in the imaging examination order, patient indications, answers to a medical questionnaire included with the imaging examination order, and/or unstructured text obtained from medical data sources other than the imaging examination order. It will be appreciated that process 500 may be performed separately (e.g., in series or in parallel) on each string of unstructured text, and the resulting feature vectors combined, or alternatively, each distinct string of unstructured text may be appended together to form a single string of unstructured text, which may be processed together. In one example, order comments 502 may comprise a string such as "76 years of age, Male, Abdominal pain s/p G-tube placement, new dilated loop of bowel in RUQ concerning for SBO . . . ".

The order comments 502 may be converted into a sequence of embedding vectors using an embedding model, and the embedding vectors may be fed to an NER model configured to identify named-entities in one or more pre-determined named-entity classes. In some embodiments, the named-entity classes may include tests (e.g., medical tests), problems (e.g., indications, diseases), and treatments (e.g., medical interventions, surgeries, medications). The embedding model may comprise a transformer based encoder, such as BERT, BioBERT, Clin BioBERT, RadBERT, ELMO, and ROBERTa, which accounts for the bi-directional context of each token in the order comments 502, thereby producing contextually dependent embedding vectors (e.g., a same token used in different contexts may map to different embedding vectors). In another example, a non-contextually sensitive embedding model may be used, such as a GLoVe and word2vec.

The NER model may be configured to receive a sequence of embedding vectors, and identify named-entities 504 in the pre-determined named-entity classes based on the embedding vectors. In some embodiments, each embedding vector in a sequence of embedding vectors may be separately classified by an NER model, wherein the NER model outputs for each embedding vector a classification vector, indicating if the token corresponding to the current embedding vector is an initiation of, or continuation of, a named-entity (and to which named-entity class the token belongs), or if the token does not belong to a named-entity class (e.g., the token is not part of a named-entity). In another embodiment, the embedding vectors may first be "chunked" (e.g., grouped into noun-phrases), and each chunk of embedding vectors may be classified as belonging to, or not belonging to, one of the pre-determined named-entity classes. As an example, for the string "76 years of age, Male, Abdominal pain s/p G-tube placement, new dilated loop of bowel in RUQ concerning for SBO . . . " included in order comments 502, the identified named-entities 504 may include ['Abdominal pain', 'new dilated loop of bowel', 'SBO'].

Each named-entity in named-entities 504 may be mapped to a corresponding medical code, such as the ICD-10-CM codes 506 shown in FIG. 5. As an example, the named-entities ['Abdominal pain', 'new dilated loop of bowel', 'SBO'] may be mapped to ICD-10-CM codes ['R109', 'K593', 'Z7289']. In some embodiments, a named-entity of named-entities 504 may be mapped to an ICD-10-CM code having a most semantically similar definition (amongst the ICD-10-CM codes), wherein, in some embodiments semantic similarity is determined based on a distance or cosine similarity between the embedding vectors corresponding to the named-entity, and an embedding vector of a definition of the ICD-10-CM codes.

As an example, the text of an ICD-10-CM definition may be embedded using a same embedding model as used to embed the order comments 502, to produce a sequence of embedding vectors for the ICD-10-CM code definition, in a same embedding space as the named-entities. The embedding vectors of the ICD-10-CM definition may be averaged, pooled, or otherwise combined, to produce a single embedding vector for the ICD-10-CM code. A pre-determined number of ICD-10-CM codes may be similarly pre-processed, thereby producing a library or repository of pre-computed embedding vector representations of all, or a sub-set, of ICD-10-CM codes. In instances where a named-entity includes multiple embedding vectors (e.g., when a named-entity spans multiple tokens), the embedding vectors of the named-entity may be combined (e.g., via averaging or pooling), to produce a single embedding vector representative of the named-entity. The embedding vector corresponding to the named-entity may then be compared with the embedding vectors for each of the pre-determined number of ICD-10-CM codes, and the named-entity may be matched with, or mapped to, the ICD-10-CM code having the most similar embedding vector, as assessed by distance or angle between the points in the embedding space represented by the embedding vectors.

Once the named-entities 504 have been mapped to corresponding ICD-10-CM codes 506, numerical vector encodings of the ICD-10-CM codes 506, referred to herein as ICD-10-CM vectors 508, may be produced. The ICD-10-CM codes 506 comprise alpha-numeric strings, which may first be converted into numerical vectors (i.e., ICD-10-CM vectors 508) before being fed to the imaging examination order classifier. In some embodiments, the ICD-10-CM codes 506 may be truncated to a pre-determined number of characters, before being encoded as ICD-10-CM vectors 508, thus controlling the dimension of the ICD-10-CM vectors 508. In one embodiment, the ICD-10-CM codes 506 may be encoded using a character level embedding strategy, wherein each character (e.g., letter, number, or punctuation) in the ICD-10-CM codes 506 is converted into corresponding integer, and combined to form a numerical vector. Since ICD-10-CM codes 506 contain letters (26), numbers (10) and a dot (1), 37 unique integers may be used to represent each character of the ICD-10-CM 506 codes. For example, the ICD-10-CM code "K58.1" may be encoded as the numerical vector [20, 5, 8, 36, 1], wherein "K" is encoded as the integer 20, "5" is encoded as the integer 5, "8" is encoded as the integer 8, "." is encoded as the integer 36, and "1" is encoded as the integer 1.

In some embodiments, a frequency encoding strategy may be used to produce the ICD-10-CM vectors 508 from the ICD-10-CM codes 506. In another embodiment, one-hot encoding may be used to produce the ICD-10-CM vectors 508 from the ICD-10-CM codes 506.

Thus, process 500 may be used to convert unstructured text, such as order comments 502, into a variable number of feature vectors, such as ICD-10-CM vectors 508, which may be combined with other feature vectors produced from structured patient data, and/or a procedure description included in the imaging examination order, and mapped to a radiology protocol recommendation, or standardized radiology protocol representation, using an imaging examination order classifier. By converting unstructured text into standardized medical codes, such as is performed by process 500, salient information within the unstructured text, even very large amounts of unstructured text, may be compactly represented in a human interpretable form.

Referring to FIG. 6, a block diagram illustrating a process 600 of standardizing a procedure description 602, is shown. Process 600 may be performed by a radiology protocol recommendation system, such as site-specific radiology protocol recommendation system 100, in response to receiving an imaging examination order. e.g., as part of a conversion of a procedure description (comprising unstructured text) into a feature vector usable by an imaging examination order classifier. The procedure description vector 620 produced by process 600 may be combined with feature vectors produced from structured data, as well as feature vectors produced from order comments, and the combined feature vectors may be used as input into an imaging examination order classifier as part of an automatic radiology protocol recommendation.

The procedure description 602 may be included in a field of an imaging examination order received by the radiology protocol recommendation system, e.g., in an OBR-4 field of a HL7 v2 message. Procedure description 602 comprises a referring physician's high-level description of a desired diagnostic scan, in an unstructured format, e.g., in written English or other natural languages. Non-limiting examples of procedure descriptions include, "CT ABDOMEN W AND WO IV CONTRAST IVP UROGRAM WITH 3D", "ABD PEL CT WO IV W PO CONT", "CT WRIST WO IV CONTRAST RIGHT".

The inventors herein have determined that procedure descriptions may be decomposed into a finite, or pre-determined, number of "description categories", wherein each description category one of a specifies finite number of configurations/options/attributes for the imaging examination being ordered. As an example, the procedure description "ABD PEL CT WO IV W PO CONT" may be decomposed into the description categories of, imaging modality (CT), body region(s) (abdomen, and pelvis), and pharmacological treatment(s) (without IV contrast, with PO contrast). Thus, a procedure description expressed as unstructured text may be converted into a vector of pre-determined length by determining a numerical code, for each of the pre-determined number of description categories, and assembling the numerical codes into a vector, as shown in FIG. 6.

As shown in FIG. 6, procedure description 602 may be decomposed into six distinct description categories, including a body region to scan during the imaging examination, pharmacological treatment to apply prior to the imaging examination, an imaging modality to employ, a modality modifier to apply to the imaging modality during the imaging examination, an anatomical focus within the body region, and a laterality associated with the body region and/or anatomical focus (e.g., a left arm versus a right arm), which may be mapped to region code 604, pharma code 606, modality code 608, modality modifier code 610, anatomy focus code 612, and laterality code 614, respectively. For each of the pre-determined number of description categories, a numerical code may be determined based the procedure description, as will be described in more detail below, with reference to FIGS. 10A, 10B, and 10C.

As an example, in the description category of "body region", zero or more body regions recited in procedure description 602 may be identified (e.g., via regex pattern matching, multi-class classification, or an ensemble of binary classifiers approach, as described in FIGS. 10A, 10B, and 10C, respectively). For each body region identified in the procedure description 602, a corresponding numerical code may be obtained, e.g., via a lookup table. An example of a lookup table which may be used to obtain numerical codes based on identified body regions recited in a procedure description, is shown in Table 1, below.

TABLE 1

Numerical codes (left column) corresponding to each of a finite number of body regions (right column) which may be included in a procedure description.

| Code | Description |
| --- | --- |
| 0 | UNKNOWN |
| 1 | HEAD |
| 2 | NECK |
| 4 | CHEST |
| 8 | BREAST |
| 16 | ABDOMEN |
| 32 | PELVIS |
| 64 | UPPER EXTREMITY |
| 128 | LOWER EXTREMITY |
| 256 | CERVICAL SPINE |
| 512 | LUMBAR SPINE |
| 1024 | THORACIC SPINE |

In some embodiments, when multiple body regions are identified in a procedure description, a single numerical code uniquely representing the combination of identified body regions may be determined by summing the individual numerical codes of each identified body region. As an example, in the procedure description "ABD PEL CT WO IV W PO CONT", the body regions of abdomen (numerical code 16), and pelvis (numerical code 32) may both be identified for the procedure category of "body region", and a numerical code of 48 (16+32=48) may be used to encode the "body region" category, or in other words, the region code 604 may be set to 48 based on the above example. In instances where one or more of the description categories is not specified by the procedure description 602, a default numerical code may be utilized for said description category. As an example, based on table 1, above, if a body region is not specified by procedure description 602, the region code 604 may be set to the default code of 0, indicating no information regarding the body region is specified. In this way, each of, region code 604, pharma code 606, modality code 608, modality modifier code 610, anatomy focus code 612, laterality code 614, may be determined based on which, if any, attributes in the respective description categories, are specified in the procedure description 602.

The numerical codes in each of the pre-determined number of description categories may be combined into a numerical vector, e.g., procedure description vector 620. The length of procedure description vector 620 may be fixed, that is, the length of the procedure description vector 620 may be independent of the length of the procedure description 602. In some embodiments, the length of the procedure description vector 620 may be equal to the number of description categories. The procedure description vector 620, shown in FIG. 6, is of length six, wherein each of the six rows of procedure description vector 620 correspond to an encoded attribute of the procedure description 602, in a respective description category.

Turning to FIG. 7, a flowchart of a first embodiment of a method 700 for automatically recommending a site-specific radiology protocol for an imaging examination order, is shown. Method 700 may be performed by a radiology protocol recommendation system, such as site-specific radiology protocol recommendation system 100, in response to receiving an imaging examination order. Method 700 may utilize an imaging examination order classifier, such as the first embodiment of an imaging examination order classifier 210, shown in FIG. 2, which is configured to recommend a site-specific radiology protocol for an imaging examination order, without first producing a standardized radiology protocol representation. In other words, method 700 may produce a site-specific radiology protocol without using a site-specific radiology protocol translator, as the imaging examination order classifier employed in method 700 may be trained to map imaging examination orders directly to site-specific radiology protocols using site-specific data, such as is described in more detail in FIG. 11A.

Method 700 begins at operation 702, wherein the radiology protocol recommendation system receives an imaging examination order comprising structured data and unstructured text. In some embodiments, the unstructured text may include one or more of a procedure description (e.g., a high-level description of the requested imaging examination), reasons for the requested imaging examination, patient indications, and answers to various questions pertaining to the requested imaging examination, whereas the structured data may include numerical and/or categorical patient data, such as patient demographic data (e.g., height, weight, BMI, age, sex, expediency class, ethnicity), a patient ID, a study code, etc. In some embodiments, upon receiving the imaging examination order, the radiology protocol recommendation system may correlate patient information extracted from the imaging examination order with one or more additional sources of medical information/patient data, which may include both structured data and unstructured text, which may be used to supplement the structured data and unstructured text obtained from the imaging examination order.

At operation 704, the radiology protocol recommendation system converts the unstructured text into one or more feature vectors (see FIGS. 5, 6, 9, 10A, 10B, 10C for a more detailed description). The unstructured text may be of variable size (e.g., several words, to tens of thousands of words), and a relevance of the unstructured text to the imaging examination order may vary. By converting the unstructured text into one or more feature vectors, e.g., by executing one or more operations of methods 900, 1000A, 1000B, 1000C, information relevant to the imaging examination order within the unstructured text may be extracted and compactly represented in a machine-readable form, which may be suitable for efficient classification using an imaging examination order classifier. In some embodiments, at operation 704, the radiology protocol recommendation system may convert the procedure description included in the imaging examination order into a feature vector comprising a pre-determined number of numerical codes (also referred to herein as a procedure description vector), describing attributes of the procedure description in a pre-determined number of description categories. In some embodiments, operation 704 further comprises the radiology protocol recommendation system converting unstructured text in the form of "reasons for the exam", order comments, patient indications, radiology reports, etc. into a plurality of feature vectors, by identifying named-entities in one or more named-entity classes relevant to the imaging examination order, mapping the identified named-entities to corresponding standardized medical codes (e.g., ICD-10-CM codes), and encoding the standardized medical codes to produce the plurality of feature vectors.

At operation 706, the radiology protocol recommendation system maps the structured data and the one or more feature vectors to a site-specific radiology protocol using an imaging examination order classifier (see FIG. 2 for a more detailed description of an exemplary imaging examination order classifier which may be employed at operation 706). The imaging examination order classifier is configured to receive a first feature vector generated from the structured data (e.g., via encoding of numerical and categorical data comprising the structured data), a second feature vector (or a plurality of feature vectors) generated by identifying and encoding named-entities within unstructured text (aside from the procedure description), and a third feature vector generated by mapping portions of a procedure description included in the imaging examination order to numerical codes in a pre-determined number of description categories, and map the first, second, and third feature vectors to one or more site-specific radiology protocols (i.e., radiology protocol recommendations).

In some embodiments, the imaging examination order classifier may include a multi-class classifier for each of a plurality of attributes of a site-specific radiology protocol (wherein attributes may include an imaging modality, a body region, an anatomical focus, and a pharmacological treatment). As an example, a first multi-class classifier may receive the first, second, and third feature vectors, and map the feature vectors to an imaging modality to use for the requested imaging examination, a second multi-class classifier may also receive the first, second, and third feature vectors, and map the feature vectors to a body region to be scanned during the requested imaging examination, and so on for each of a pre-determined number of attributes defining a site-specific radiology protocol.

In another embodiment, the imaging examination order classifier may comprise a single multi-class classifier, wherein each "class" corresponds to a distinct site-specific radiology protocol, e.g., the output of the imaging examination order classifier may comprise a prediction of a most probable class to which the structured data and unstructured text belong, and the class may map to a distinct site-specific radiology protocol. As an example, the imaging examination order classifier may map the first, second, and third feature vectors, to a classification vector, having a vector of length N, wherein N is a positive integer greater than one, and wherein N is equal to a number of distinct radiology protocols at the deployment site.

At operation 708, the radiology protocol recommendation system stores the site-specific radiology protocol in non-transitory memory, as a site-specific radiology protocol recommendation. In some embodiments, the radiology protocol recommendation system may transmit the site-specific radiology protocol to a care provider device for a referring clinician, a radiologist, or a technologist to review. In some embodiments, the radiology protocol recommendation system may transmit the site-specific radiology protocol recommendation to an imaging device, which may automatically identify a device level imaging protocol based thereon. In some embodiments, the radiology protocol recommendation system may transmit the radiology protocol to an RIS, and/or an EHR database, for storage in non-transitory memory located therein.

Following operation 708, method 700 may end. In this way, method 700 enables a site-specific radiology protocol to be automatically determined based on an imaging examination order, by leveraging both structured data, and unstructured text.

Turning to FIG. 8, a flowchart of a second embodiment of a method 800 for automatically recommending site-specific radiology protocols for imaging examination orders, is shown. Method 800 may be performed by a radiology protocol recommendation system, such as site-specific radiology protocol recommendation system 100, in response to receiving an imaging examination order. Method 800 may utilize an imaging examination order classifier, such as the second embodiment of an imaging examination order classifier 310, shown in FIG. 3, to map an imaging examination order to a standardized radiology protocol representation. The imaging examination order classifier utilized in method 800 may be trained to map structured data and unstructured text to a site-independent standardized radiology protocol representation, by executing one or more operations of method 1100B. The standardized radiology protocol representation may subsequently be mapped to a site-specific radiology protocol using a site-specific radiology protocol translator, such as site-specific radiology protocol translator 324, shown in FIG. 3. The site-specific radiology protocol translator employed in method 800 may be trained by performing one or more operations of method 1200.

Method 800 begins at operation 802, wherein the radiology protocol recommendation system receives an imaging examination order comprising structured data and unstructured text. In some embodiments, the unstructured text may include one or more of a procedure description (e.g., a high-level description of the requested imaging examination), reasons for the requested imaging examination, patient indications, and answers to various questions pertaining to the requested imaging examination, whereas the structured data may include numerical and/or categorical patient data, such as patient demographic data (e.g., height, weight, BMI, age, sex, expediency class, ethnicity), a patient ID, a study code, etc. In some embodiments, upon receiving the imaging examination order, the radiology protocol recommendation system may correlate patient information extracted from the imaging examination order with one or more additional sources of medical information/patient data, which may include both structured data and unstructured text, which may be used to supplement the structured data and unstructured text included in the imaging examination order.

At operation 804, the radiology protocol recommendation system converts the unstructured text into one or more feature vectors (see FIGS. 5, 6, 9, 10A, 10B, 10C for a more detailed description). In some embodiments, at operation 804, the radiology protocol recommendation system may convert the procedure description included in the imaging examination order into a feature vector comprising a pre-determined number of numerical codes (also referred to herein as a procedure description vector), wherein each of the pre-determined number of numerical codes indicates an attribute of the procedure description in one of a pre-determined number of description categories. In some embodiments, operation 804 further includes the radiology protocol recommendation system converting unstructured text other than the procedure description, including "reasons for the exam", order comments, patient indications, radiology reports, etc., into a plurality of feature vectors, by identifying named-entities in one or more named-entity classes relevant to the imaging examination order, mapping the identified named-entities to corresponding standardized medical codes (e.g., ICD-10-CM codes), and encoding the standardized medical codes to produce the plurality of feature vectors.

At operation 806, the radiology protocol recommendation system maps the structured data and the one or more feature vectors to a standardized radiology protocol representation using an imaging examination order classifier (see FIG. 3 for a more detailed description of an exemplary imaging examination order classifier which may be employed at operation 806). The standardized radiology protocol representation comprises a vector of attributes or categorical classifications, including imaging modality (one of a finite number of possible imaging modalities), body region (one or more of a finite number of possible body regions to be scanned), anatomical focus (one or more of a finite number of anatomical regions, such as organs, within the body region to be scanned), pharmacological treatment (one of more of a finite number of pharmacological treatments, such as consumption or injection of radiological contrast agents, to be performed prior to scanning), and patient indications (one or more of a pre-determined number of medical codes, or vector encoded medical codes, corresponding to patient indications).

The imaging examination order classifier is configured to receive a first feature vector generated from the structured data (e.g., via encoding of numerical and categorical data comprising the structured data), a second feature vector (or a plurality of feature vectors) generated by identifying and encoding named-entities within unstructured text (aside from the procedure description), and a third feature vector generated by mapping portions of a procedure description included in the imaging examination order to numerical codes in a pre-determined number of description categories, and map the first, second, and third feature vectors to an intermediate representation of a radiology protocol (i.e., a standardized radiology protocol representation). In some embodiments, the variable number of feature vectors produced from unstructured text (e.g., order comments), may be combined using average pooling, max pooling, min pooling, or other methods known in the art of machine learning to produce a pre-determined number of vectors from a variable number of vectors.

In some embodiments, the imaging examination order classifier may include a multi-class classifier for each of a plurality of attributes of a standardized radiology protocol representation (wherein attributes may include an imaging modality, a body region, an anatomical focus, a pharmacological treatment, and patient indications). As an example, a first multi-class classifier may receive the first, second, and third feature vectors, and map the feature vectors to an imaging modality to use for the requested imaging examination, a second multi-class classifier may also receive the first, second, and third feature vectors, and map the feature vectors to a body region to be scanned during the requested imaging examination, and so on for each of a pre-determined number of attributes defining a standardized radiology protocol representation.

In another embodiment, the imaging examination order classifier may comprise a single multi-class classifier, wherein each "class" corresponds to a distinct standardized radiology protocol representation, e.g., the output of the imaging examination order classifier may comprise a prediction of a most probable class to which the structured data and unstructured text belong, and the class may map to a distinct standardized radiology protocol representation. As an example, the imaging examination order classifier may map the first, second, and third feature vectors, to a classification vector, having a vector of length N, wherein N is a positive integer greater than one, and wherein N is equal to a number of distinct standardized radiology protocol representations.

At operation 808, the radiology protocol recommendation system translates the standardized radiology protocol representation to a site-specific radiology protocol using a site-specific radiology protocol translator (see FIG. 3 for additional description). In some embodiments, the site-specific radiology protocol translator may comprise a multi-class classifier, configured to receive the standardized radiology protocol representation as input, and map the standardized radiology protocol representation to the site-specific radiology protocol (e.g., via a classification vector, wherein each row of the classification vector corresponds to a distinct site-specific radiology protocol).

In some embodiments, the site-specific radiology protocol translator may comprise a dictionary or lookup table, wherein attributes of the standardized radiology protocol representation may be used as keys to efficiently map to corresponding values from the dictionary or lookup table, wherein the values correspond to the site-specific translations of the attributes of the standardized radiology protocol representation. In this way, each of attribute of the standardized radiology protocol (e.g., imaging modality, body region, anatomical focus, and pharmacological treatment) may be independently mapped to site-specific equivalent expressions. As an example, the site-specific radiology protocol translator may map a pharmacological treatment attribute of the standardized radiology protocol representation (expressed in a standard medical lexicon, such as RADLEX) to a site-specific pharmacological treatment available at the deployment site, by using the standardized/generic pharmacological treatment attribute as a key to look-up an equivalent site-specific pharmacological treatment indexed by said key.

At operation 810, the radiology protocol recommendation system stores the site-specific radiology protocol in non-transitory memory, as a site-specific radiology protocol recommendation. In some embodiments, the radiology protocol recommendation system may transmit the site-specific radiology protocol to a care provider device for a referring clinician, a radiologist, or a technologist to review. In some embodiments, the radiology protocol recommendation system may transmit the site-specific radiology protocol recommendation to an imaging device, which may automatically identify a device level imaging protocol based thereon. In some embodiments, the radiology protocol recommendation system may transmit the radiology protocol to an RIS and/or an EHR database, for storage in non-transitory memory located therein.

Following operation 810, method 800 may end. In this way, method 800 enables a site-specific radiology protocol to be automatically determined based on an imaging examination order, by leveraging both structured data, and unstructured text, and further enables a single imaging examination order classifier to be deployed at multiple-sites, without re-training of the imaging examination order classifier at each site. As the site-specific radiology protocol translator may comprise a substantially more light-weight machine learning model than the imaging examination order classifier, training of the site-specific radiology protocol translator may be performed with substantially less computational overhead than site-by-site retraining of the imaging examination order classifier.

Figure 9:
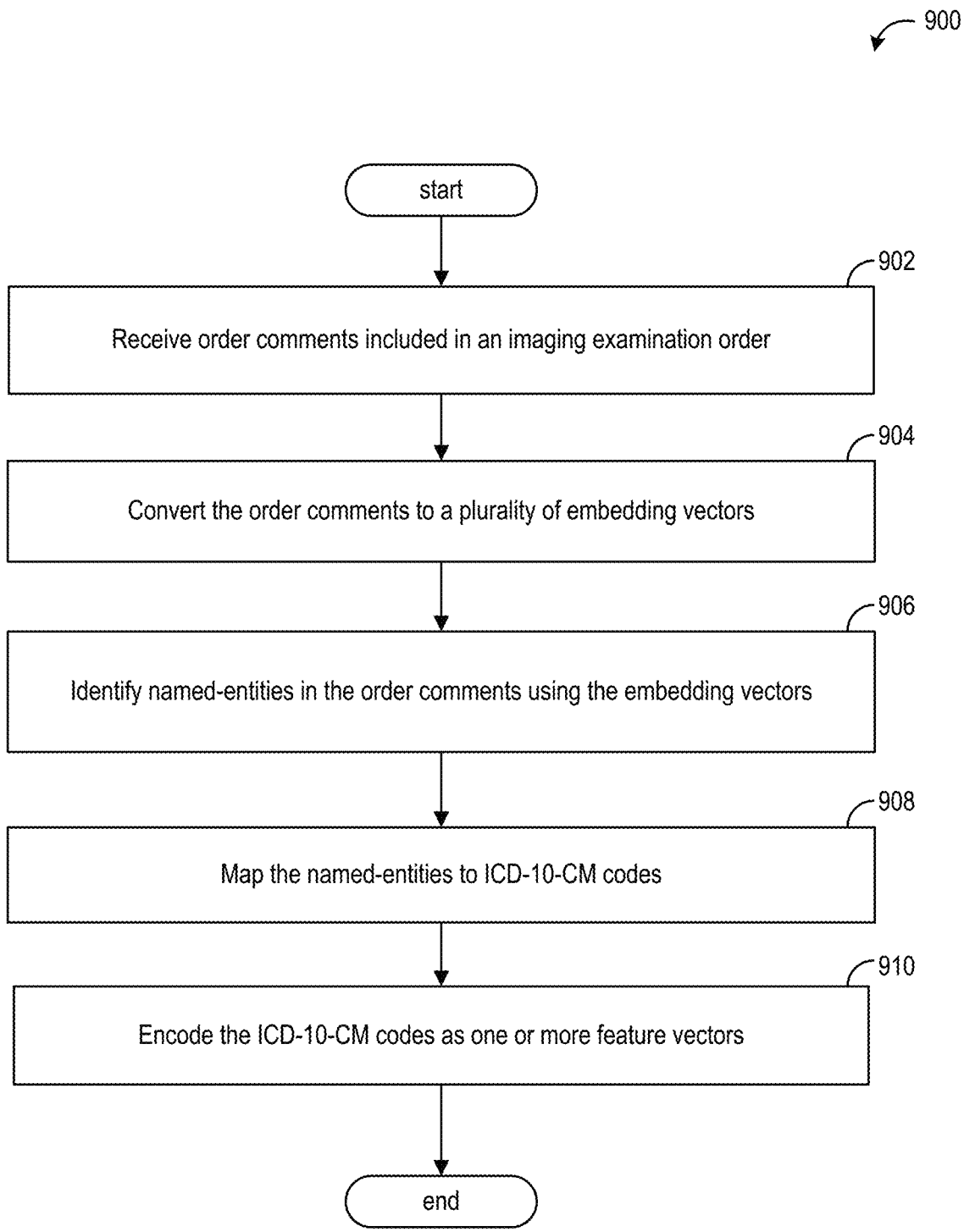
FIG. 9 shows a flowchart illustrating a method for converting order comments included in an imaging examination order into one or more feature vectors, in accordance with an aspect of the disclosure.
Figure 10A:
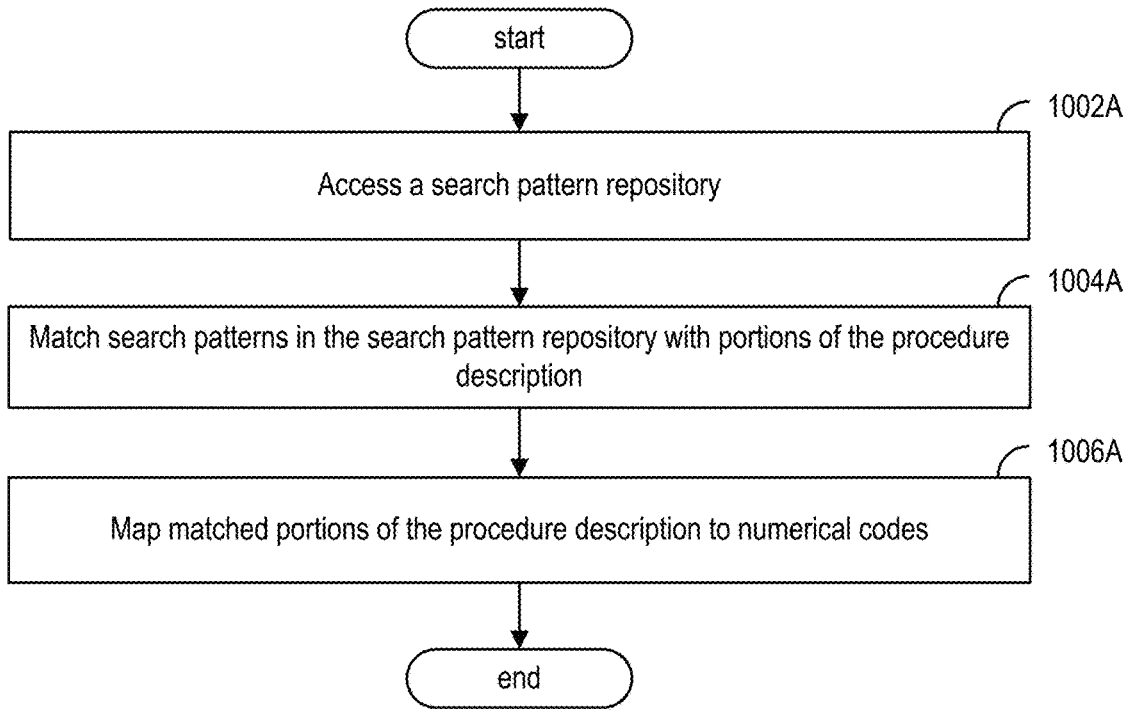
FIG. 10A shows a flowchart illustrating a first embodiment of a method for standardizing a procedure description included in an imaging examination order by converting the procedure description into one or more standardized codes.
Figure 10B:
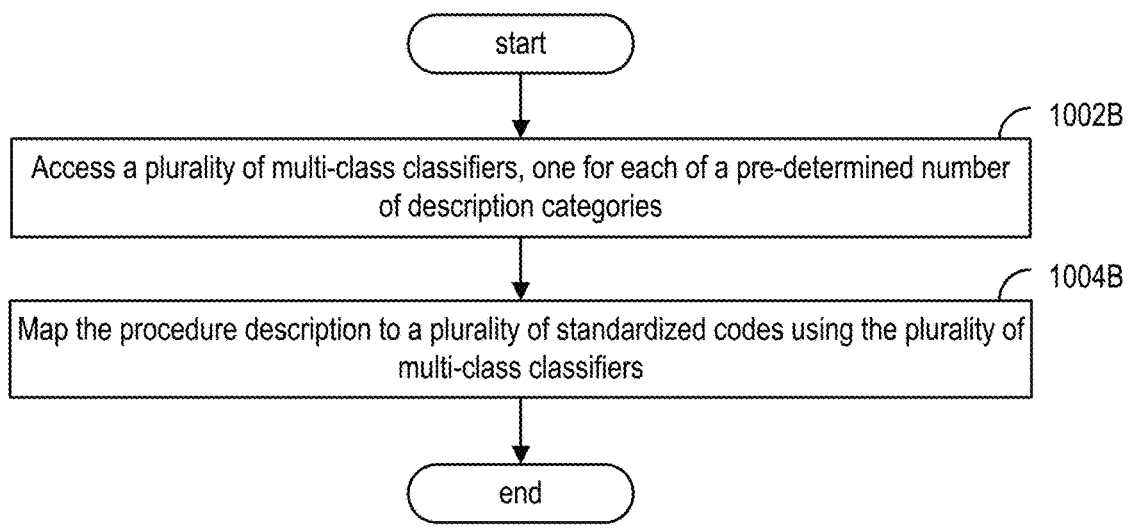
FIG. 10B shows a flowchart illustrating a second embodiment of a method for standardizing a procedure description included in an imaging examination order by converting the procedure description into one or more standardized codes.
Figure 10C:
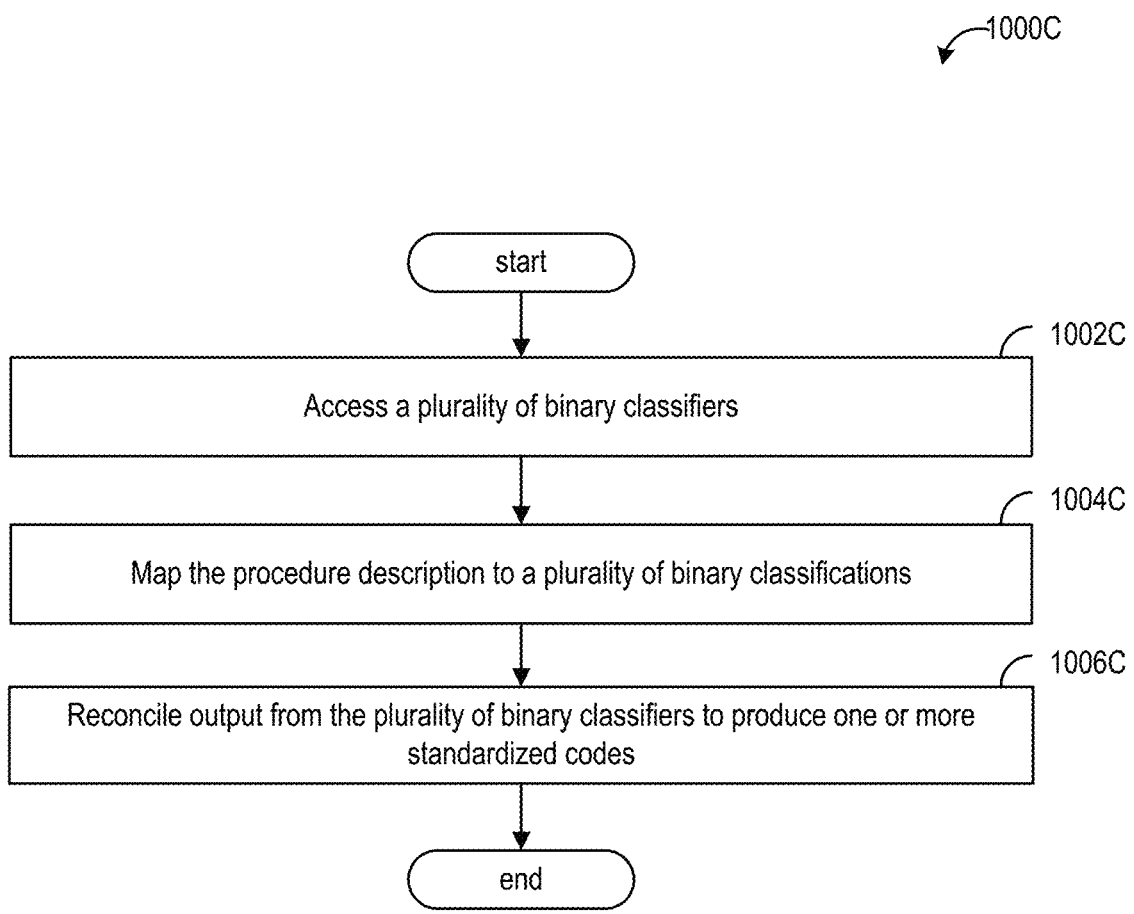
FIG. 10C shows a flowchart illustrating a third embodiment of a method for standardizing a procedure description included in an imaging examination order by converting the procedure description into one or more standardized codes.

Referring to FIG. 9, a flowchart of a method 900 for converting unstructured text, such as order comments included in an imaging examination order, into ICD-10-CM feature vectors, is shown. Method 900 may be performed by a radiology protocol recommendation system, such as site-specific radiology protocol recommendation system 100, as part of a method for automatically recommending a site-specific radiology protocol which may satisfy an imaging examination order (e.g., at operation 704 of method 700, and at operation 804 of method 800). The ICD-10-CM feature vectors produced by method 900 may be combined with feature vectors produced from structured data, as well as feature vectors produced from a procedure description, and the combined feature vectors may be used as input into an imaging examination order classifier. Although ICD-10-CM codes discussed with reference to method 900, it will be appreciated that other standardized medical codes, may be used, including but not limited to, SNOMED, CPT, RxNorm, and RADLEX.

Method 900 begins at operation 902, wherein radiology protocol recommendation system receives order comments included in an imaging examination order. The imaging examination order may be received from a care provider device, and/or may be received from an RIS in response to a request received by the RIS from an EHR and/or the care provider device. The imaging examination order may be in a pre-determined format, such as an HL7 v2 message. Unstructured text included in the imaging examination order may be identified and extracted by the radiology protocol recommendation system, e.g., by parsing structured fields included in the imaging examination order.

At operation 904, the radiology protocol recommendation system converts the order comments into a plurality of embedding vectors. In some embodiments, the order comments may be converted into a sequence of embedding vectors using an embedding model, which may comprise a transformer based encoder, such as BERT, BioBERT, Clin BioBERT, RadBERT, ELMO, and ROBERTa, which accounts for the bi-directional context of each token in the order comments, thereby producing contextually dependent embedding vectors. In some embodiments, a non-contextually sensitive embedding model may be used, such as a GLoVe and word2vec.

At operation 906, the radiology protocol recommendation system identifies named-entities in the order comments using the embedding vectors produced at operation 904. In some embodiments, the embedding vectors may be fed to an NER (named-entity recognition) model, and outputs from the NER model may be used to identify named-entities present within the order comments. In some embodiments, the NER model may comprise a bi-directional long short-term memory model (BI-LSTM) or a linear neural network. In some embodiments, each embedding vector in the sequence of embedding vectors may be separately classified by the NER model, wherein the NER model outputs for each embedding vector a classification vector, indicating if the token/substring corresponding to the current embedding vector is an initiation of, or continuation of, a named-entity (and to which named-entity class the token/substring belongs), or if the token does not belong to a named-entity class (e.g., the token is not part of a named-entity). In another embodiment, the embedding vectors may first be "chunked" (e.g., grouped into noun-phrases), and each chunk of embedding vectors may be classified as belonging to, or not belonging to, one of the pre-determined named-entity classes. As an example, for the order comments "63 years of age, Female, h/o stage IV renal cell cancer, serial scan to evaluate possible mets." the identified named-entities may include ['stage IV renal cell cancer', 'mets'].

At operation 908, the radiology protocol recommendation system maps the named-entities to corresponding ICD-10-CM codes. Each named-entity may be mapped to a corresponding medical code, such as ICD-10-CM codes. As an example, the named-entities ['stage IV renal cell cancer', 'mets'] may be mapped to ICD-10-CM codes ['C569', 'Z7689']]. In some embodiments, a named-entity may be mapped to an ICD-10-CM code having a most semantically similar description amongst a plurality of ICD-10-CM codes. In some embodiments, semantic similarity is determined based on a distance or cosine similarity between the embedding vectors corresponding to the named-entity, and an embedding vector of a description of the ICD-10-CM codes. As an example, the text of an ICD-10-CM description may be embedded using a same embedding model as used to embed the order comments, to produce a sequence of embedding vectors for the ICD-10-CM code description, in a same embedding space as the named-entities. The embedding vectors of the ICD-10-CM description may be averaged, pooled, or otherwise combined, to produce a single embedding vector for the ICD-10-CM description. A pre-determined number of ICD-10-CM code descriptions may be similarly pre-processed, thereby producing a library or repository of pre-computed embedding vector representations of all, or a sub-set, of ICD-10-CM codes. In instances where a named-entity includes multiple embedding vectors (e.g., when a named-entity spans multiple tokens), the embedding vectors of the named-entity may be combined (e.g., via averaging or pooling), to produce a single embedding vector representative of the named-entity. The embedding vector corresponding to the named-entity may then be compared with the embedding vectors for each of the ICD-10-CM code descriptions, and the named-entity may be matched with, or mapped to, the ICD-10-CM code having the most similar embedding vector, as assessed by distance or angle between the points in the embedding space represented by the embedding vectors.

At operation 910, the radiology protocol recommendation system encodes the ICD-10-CM codes as one or more feature vectors. The ICD-10-CM codes comprise alphanumeric strings, which may be converted into numerical vectors before being fed to the imaging examination order classifier. In one embodiment, the ICD-10-CM codes may be encoded using a character level embedding strategy, wherein each character (e.g., letter, number, or punctuation) in the ICD-10-CM code is converted into corresponding integer, and combined to form a numerical vector. For example, the ICD-10-CM code "C569" may be encoded as the numerical vector [12, 5, 6, 9], wherein "C" is encoded as the integer 12, "5" is encoded as the integer 5, "6" is encoded as the integer 6, and "9" is encoded as the integer 9. In some embodiments, a frequency encoding strategy may be used to produce the ICD-10-CM vectors from the ICD-10-CM codes. In another embodiment, one-hot encoding may be used to produce the ICD-10-CM vectors from the ICD-10-CM codes. In some embodiments, the ICD-10-codes may be truncated to a pre-determined number of characters, before being encoded as vectors, thus controlling the dimension of the feature vectors. Following operation 910, method 900 may end.

Thus, method 900 may be used to convert unstructured text, such as order comments, into a plurality of feature vectors, such as ICD-10-CM vectors, which may be combined with other feature vectors produced from structured patient data, and/or a procedure description included in the imaging examination order, and mapped to a radiology protocol recommendation, or standardized radiology protocol representation, using an imaging examination order classifier.

FIG. 10A shows a flowchart of a method 1000A for standardizing a procedure description included in an imaging examination order, by converting the unstructured text of the procedure description into a procedure description vector. In particular, method 1000A comprises matching search patterns stored in a search pattern repository with portions of the procedure description, wherein each search pattern may be associated with a numerical code, and for each search pattern matching the procedure description, the corresponding numerical codes may be integrated into the procedure description vector. Method 1000A may be performed by a radiology protocol recommendation system, such as site-specific radiology protocol recommendation system 100, in response to receiving an imaging examination order.

Method 1000A begins at operation 1002A, wherein the radiology protocol recommendation system accesses a search pattern repository. In some embodiments, a search pattern repository may comprise a file or data structure storing a plurality of pre-determined search patterns. Search patterns in the search pattern repository may be periodically updated, by adding, removing, or altering, search patterns stored therein. Search patterns may comprise regular-expression (regex) patterns. The search pattern repository may include one or more search patterns in each of a pre-determined number of description categories. In some embodiments, description categories may include a body region to examine, an anatomical focus within the body region, an imaging modality to employ for the imaging examination, a modality modifier to apply to the imaging modality, a pharmacological treatment to apply prior to the imaging examination, and a laterality of the imaging examination. Further, in some embodiments each of a pre-determined number of options, configurations, or states of each of the description categories may include one or more search patterns, which may be stored in the search pattern repository. As an example, for the description category of "body region", a pre-determined number of body region options, such as head, neck, chest, breast, abdomen, pelvis, upper extremity, lower extremity, cervical spine, thoracic spine, and lumbar spine, may each be associated with one or more search patterns. As an example, the search pattern repository may include a dictionary entry such as: "neckMatch": ["neck", "thyroid", "parathyroid "," parotid"], specifying for the body region option of "neck" a list of search patterns which, if found within the procedure description, should be mapped to a numerical code corresponding to "neck" (e.g., see Table 1 for an exemplary list of numerical codes which may be used as numerical representations of body regions).

At operation 1004A, the radiology protocol recommendation system matches search patterns in the search pattern repository with portions of the procedure description. In some embodiments, each of the search patterns stored in the search pattern repository may be applied to the procedure description. Each matching search pattern may be recorded and/or stored. In some embodiments a portion of the procedure description matching the search pattern may be determined and stored.

At operation 1006A, the radiology protocol recommendation system maps matching portions of the procedure description to numerical codes for each of the pre-determined number of description categories. Search patterns matching one or more portions (or substrings) of the procedure description may be used in generation of a standardized procedure description vector, e.g., by accessing the numerical code associated with the matching search pattern, and either inserting the numerical code as an entry into the procedure description vector, or reconciling the numerical code with other numerical codes matching the procedure description in a same description category. As an example, if search patterns for both a "head" body region and a "neck" body region are matched with portions of the procedure description, the numerical codes for both "head" and "neck" may be accessed, and summed, to produce a single numerical code uniquely identifying the combination of body regions specified in the procedure description. In some embodiments, if no search patterns in a description category match the procedure description (e.g., no patterns matching one of the pre-determined number of body regions), then a default numerical code may be used for said description category.

Following operation 1006A, method 1000A may end. In this way, a procedure description comprising unstructured text may be rapidly converted into a description vector comprising a pre-determined number of numerical codes, which may be combined with other feature vectors produced from structured and/or unstructured text, and used to automatically recommend a radiology protocol.

FIG. 10B shows a flowchart of a method 1000B for standardizing a procedure description included in an imaging examination order, by converting the unstructured text of the procedure description into a procedure description vector. In particular, method 1000B comprises classifying the procedure description, using a plurality of multi-class classifier, into one of a pre-determined number of classes (each corresponding to a unique numerical code), in each of a pre-determined number of description categories. The numerical codes determined in each description category may then be assembled into the description vector. Method 1000B may be performed by a radiology protocol recommendation system, such as site-specific radiology protocol recommendation system 100, in response to receiving an imaging examination order.

Method 1000B begins at operation 1002B, wherein the radiology protocol recommendation system accesses a plurality of multi-class classifiers, one for each of the pre-determined number of description categories. As an example, at operation 1002B, the radiology protocol recommendation system may access a first multi-class classifier configured to identify a body region specified by the procedure description, a second multi-class classifier configured to identify an anatomical focus specified by the procedure description, a third multi-class classifier configured to identify an imaging modality specified by the procedure description, a fourth multi-class classifier configured to identify a pharmacological treatment specified by the procedure description, and so on, for each of the pre-determined number of description categories. In some embodiments, the plurality of multi-class classifiers includes, but is not limited to, linear support vector machines (linear SVMs), random forest classifiers, XGBoost classifiers, and lightGBM classifiers.

At operation 1004B, the radiology protocol recommendation system, maps the procedure description to a plurality of standardized codes using the plurality of multi-class classifiers. In some embodiments, each of the plurality of multi-class classifiers may output a distinct classification vector, wherein the classification vector includes entries for each of a pre-determined number of options, configurations, states, or combinations thereof, in the respective description category. As an example, a multi-class classifier configured to identify a body region (or body regions) specified in the procedure description may include a classification vector having one entry per each of a pre-determined number of body regions (e.g., head, neck, chest, etc.), as well as one entry for each possible combination of body regions (e.g., head+neck, head+chest, neck+chest, etc.), and an additional entry for procedure descriptions which do not specify a body region. Each of the entries in the classification vectors may map to numerical codes, e.g., a head classification for body region may map to a numerical code of 1, a neck classification for body region may map to a numerical code of 2, a chest classification for body region may map to a numerical code of 4, a head+neck classification for body region may map to a numerical code of 3, etc.

Following operation 1004B, method 1000B may end. In this way, a procedure description comprising unstructured text may be converted into a description vector comprising a pre-determined number of numerical codes, which may be combined with other feature vectors produced from structured and/or unstructured text, and used to automatically recommend a radiology protocol.

FIG. 10C shows a flowchart of a method 1000C for standardizing a procedure description included in an imaging examination order, by converting the unstructured text of the procedure description into a procedure description vector. In particular, method 1000C comprises, in each of a pre-determined number of description categories, accessing a corresponding plurality of binary classifiers, mapping the procedure description to a plurality of binary classifications using the plurality of binary classifiers, and reconciling the plurality of binary classifications to produce a single numerical code for the description category. The numerical codes determined in each description category may then be assembled into the description vector. Method 1000C may be performed by a radiology protocol recommendation system, such as site-specific radiology protocol recommendation system 100, in response to receiving an imaging examination order.

Method 1000C begins at operation 1002C, wherein the radiology protocol recommendation system accesses a plurality of binary classifiers for a description category of a pre-determined number of description categories. In some embodiments, there may be one binary classifier per each of a pre-determined number of options, configurations, or states, of the description category. As an example, at operation 1002C, for the description category of "body region" the radiology protocol recommendation system may access a plurality of binary classifiers, including a first binary classifier configured to provide a yes/no determination of if the procedure description refers to a body region of "head", a second binary classifier configured to provide a yes/no determination of if the procedure description refers to a body region of "neck", a third binary classifier configured to provide a yes/no determination of if the procedure description refers to a body region of "chest", a fourth binary classifier configured to provide a yes/no determination of if the procedure description refers to a body region of "breast", a fifth binary classifier configured to provide a yes/no determination of if the procedure description refers to a body region of "abdomen", and so on, for each of a finite number of individual body regions. In some embodiments, the plurality of binary classifiers includes, but is not limited to, linear support vector machines (linear SVMs), random forest classifiers, XGBoost classifiers, and lightGBM classifiers, and logistic regression models.

At operation 1004C, the radiology protocol recommendation system, maps the procedure description to a plurality of binary outputs/classifications. Each binary classifier may output a binary (yes/no, true/false, I/O) output. Thus, at operation 1004C the plurality of binary classifiers may produce one binary classification per each of the pre-determined number of options, configurations, or states, of the description category. As an example, for the description category of "pharmacological treatment" two binary classifiers may be accessed at operation 1002C, corresponding to the pre-determined states of "without IV contrast", and "with IV contrast". At operation 1004C, the two binary classifiers may produce the outputs of 1, and 0, respectively, indicating that the procedure description specifies the imaging examination be performed without IV contrast. Alternatively, if the two binary classifiers produce outputs of 1, and 1, respectively, this indicates the procedure description specifies the imaging examination be conducted without, and then with IV contrast.

At operation 1006C, the radiology protocol recommendation system reconciles the plurality of binary outputs, to produce a single numerical code for the description category. As an example, a plurality of binary classifiers configured to identify a body region specified in the procedure description may include one binary classification for each individual body region. In order to reconcile the plurality of binary classifications into a single numerical code, each binary classification may be mapped to a corresponding code, to produce a plurality of codes for the description category, and the plurality of codes may be summed, to produce a single numerical code representing the state of the procedure description with respect to the current description category. As an example, a first binary classification of 0 produced by a first binary classifier configured to detect recitation of a head body region in the procedure description, may indicate that the head body region is not recited in the procedure description, whereas a second binary classification of 1, produced by a second binary classifier configured to detect recitation of a neck body region in the procedure description may indicate that the neck body region is recited in the procedure description, further, a third binary classification of 1, produced by a third binary classifier configured to detect recitation of a chest body region in the procedure description may indicate that the chest body region is recited in the procedure description. The first, second, and third, binary classifications may be mapped to corresponding numerical codes of 0 (all negative binary classifications may be mapped to 0), 2, and 4, and the numerical codes may be summed to produce a single numerical code of 6, for the procedure description of body region (it is assumed in this example that all other binary classifications for all other body regions are also negative).

Following operation 1006C, method 1000C may end. It will be appreciated that method 1000C may be repeated for each of the pre-determined number of description categories. In this way, a procedure description comprising unstructured text may be converted into a description vector comprising a pre-determined number of numerical codes, which may be combined with other feature vectors produced from structured and/or unstructured text, and used to automatically recommend a radiology protocol. By using binary classifiers, a single binary classifier may be assigned to each of a finite number of states, or configurations, for the description category, and the overall state or configuration may be derived from the binary classifier outputs, without need for explicitly predicting higher order states (e.g., by predicting binary outputs for "atomic" states, such as head, chest, neck, etc. compound states such as "head+neck" may be derived without need for separately predicting a "head" state and a "head+neck" state.).

Figure 11A:
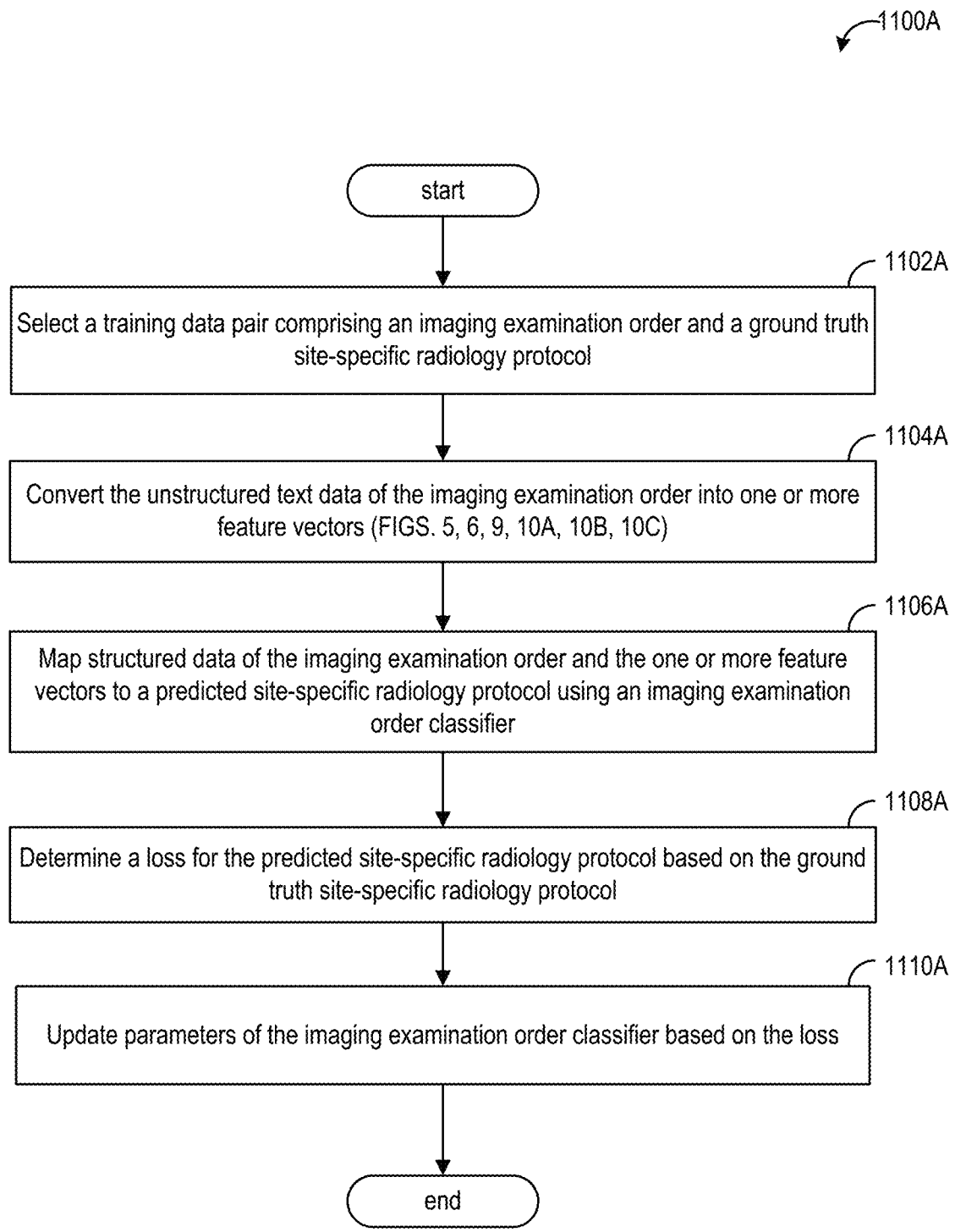
FIG. 11A shows a flowchart illustrating a method for training the first embodiment of the imaging examination classifier, shown in FIG. 2, in accordance with an aspect of the disclosure.

Turning to FIG. 11A, a flowchart of a first embodiment of a training method 1100A for training an imaging examination order classifier to map feature vectors derived from structured data and unstructured text of an imaging examination order, to site-specific radiology protocols, is shown. In some embodiments, method 1100A may be performed by a radiology protocol recommendation system, such as site-specific radiology protocol recommendation system 100. Method 1100A may be performed to train an imaging examination order classifier, such as the first embodiment of an imaging examination order classifier 210, shown in FIG. 2, to bypass conversion of the imaging examination order into a standardized radiology protocol representation, and instead map the structured data and unstructured text extracted from the imaging examination order directly to a site-specific radiology protocol. In some embodiments, method 1100A may be repeated at each deployment site, to enable the imaging examination order classifier to learn the site-specific radiology protocols available at the deployment site, as well as to learn a site-specific syntax for expressing said radiology protocols.

Method 1100A begins at operation 1102A, wherein the radiology protocol recommendation system selects a training data pair comprising an imaging examination order and a ground truth site-specific radiology protocol. In some embodiments, training data pairs may be collected from a particular deployment site, e.g., by recording imaging examination orders and the radiology protocols into which the imaging examination orders mature into, and storing the imaging examination order and the radiology protocol as a training data pair comprising input data (the imaging examination order), and ground truth data (the site-specific radiology protocol). In some embodiments, method 1100A may be performed in substantially real-time at a deployment site, by monitoring imaging examination orders transmitted to an RIS of the deployment site, and correlating the imaging examination orders with executed radiology protocols, and storing the imaging examination order and the executed radiology protocol as a training data pair.

At operation 1104A, the radiology protocol recommendation system converts the unstructured text data of the imaging examination order into one or more feature vectors (see FIGS. 5, 6, 9, 10A, 10B, 10C for additional description). Briefly, the radiology protocol recommendation system may convert the procedure description included in the imaging examination order into a procedure description vector comprising a pre-determined number of numerical codes describing attributes of the procedure description in a pre-determined number of description categories. In some embodiments, operation 1104A further comprises the radiology protocol recommendation system converting unstructured text in the form of order comments (e.g., "reasons for the exam", patient indications, radiology reports, etc.) into a plurality of feature vectors, by identifying named-entities in one or more named-entity classes relevant to the imaging examination order, mapping the identified named-entities to corresponding standardized medical codes, and encoding the standardized medical codes as vectors to produce the plurality of feature vectors.

At operation 1106A, the radiology protocol recommendation system maps structured data of the imaging examination order and the one or more feature vectors produced from unstructured text, to a predicted site-specific radiology protocol using an imaging examination order classifier. In some embodiments, the imaging examination order classifier may include a distinct multi-class classifier for each of a plurality of attributes of a site-specific radiology protocol (wherein attributes may include an imaging modality, a body region, an anatomical focus, and a pharmacological treatment). As an example, a first multi-class classifier may receive a first feature vector produced by encoding the structured data included in the imaging examination order, a second feature vector produced by encoding information extracted from the procedure description, and a third feature vector (or plurality of feature vectors) produced by encoding information extracted from the order comments, and map the feature vectors to an imaging modality attribute of the predicted site-specific radiology protocol. A second multi-class classifier may also receive the first, second, and third feature vectors, and map the feature vectors to a body region to be scanned during the requested imaging examination, and so on for each of a pre-determined number of attributes defining a site-specific radiology protocol. In embodiments wherein the imaging examination order classifier comprises a plurality of distinct multi-class classifiers, method 1100A may be employed to train each of the plurality of multi-class classifiers using a same training data set, e.g., by performing operations 1108A, and 1110A for each of the plurality of multi-class classifiers.

In another embodiment, the imaging examination order classifier may comprise a single multi-class classifier, wherein, instead of predicting each attribute of a radiology protocol individually, the imaging examination order classifier makes predictions at the level of site-specific radiology protocols, comprising a pre-determined set of attributes. As an example, the imaging examination order classifier may map the first, second, and third feature vectors, to a single classification vector, having a vector of length N, wherein N is a positive integer greater than one, and wherein N is equal to a number of distinct site-specific radiology protocols at the deployment site.

At operation 1108A, the radiology protocol recommendation system determines a loss for the predicted site-specific radiology protocol based on the ground truth site-specific radiology protocol. In embodiments in which the imaging examination order classifier comprises an ensemble of multi-class classifier (e.g., one multi-class classifier per attribute of the site-specific radiology protocol), operation 1108A may include determining a loss for each predicted attribute, which may then be used to separately adjust the parameters of each multi-class classifier at operation 1110A. However, in embodiments in which the imaging examination order classifier comprises a single multi-class classifier, operation 1110A includes determining a single loss value, by comparing the predicted site-specific radiology protocol with the ground truth site-specific radiology protocol. In some embodiments, a loss function, such as a cross-entropy loss, may be used to determine the loss for the predicted radiology protocol.

At operation 1110A, the weights and biases of the imaging examination order classifier are adjusted based on the loss determined at operation 1108A. In some embodiments, the parameters of the imaging examination order classifier, may be adjusted to reduce the loss over a training data set. In some embodiments, parameters of the machine learning models used to encode the unstructured text (e.g., the embedding models, the NER models, and/or the multi-class classifiers/binary classifiers used to standardize the procedure description) may be frozen, that is, may not be adjusted during execution of operation 1110A. However, in some embodiments, parameters of the machine learning models used to encode the unstructured text (e.g., the embedding models, the NER models, and/or the multi-class classifiers/binary classifiers used to standardize the procedure description) may be adjusted along with parameters of the imaging examination order classifier, thus enabling an end-to-end training of the machine learning models used to recommend site-specific radiology protocols.

In some embodiments, back propagation of the loss may occur according to a gradient descent algorithm, wherein a gradient of the loss function (a first derivative, or approximation of the first derivative) is determined for each weight and bias of the imaging examination order classifier. Each weight (and bias) of the imaging examination order classifier is then updated by adding the negative of the product of the gradient determined (or approximated) for the weight (or bias) with a predetermined step size. Following operation 1110A, method 1100A may end.

It will be noted that method 1100A may be repeated for each of a plurality of training data pairs in a training data set, and this process may be repeated until a stop condition is met. Wherein, in some embodiments, the stop condition comprises one or more of the loss decreasing to below a threshold loss, a rate of loss change decreasing to below a threshold rate of loss change, a validation loss, determined over a validation data set, reaching a minimum, etc.

Figure 11B:
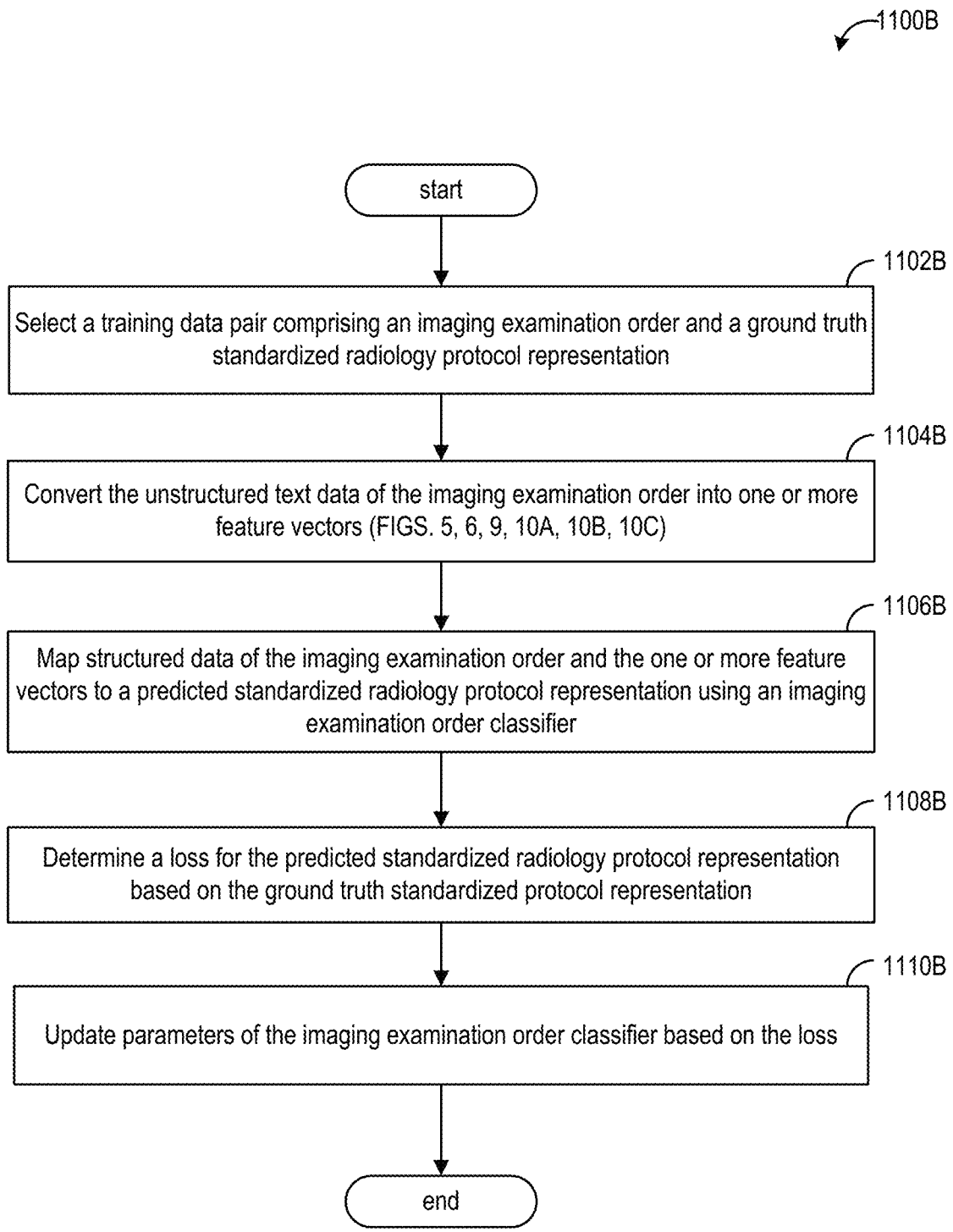
FIG. 11B shows a flowchart illustrating a method for training the second embodiment of the imaging examination classifier, shown in FIG. 3, in accordance with an aspect of the disclosure.

Turning to FIG. 11B, a flowchart of a second embodiment of a training method 1100B for training an imaging examination order classifier to map feature vectors derived from structured data and unstructured text of an imaging examination order, to standardized radiology protocol representations, is shown. In some embodiments, method 1100B may be performed by a radiology protocol recommendation system, such as site-specific radiology protocol recommendation system 100. Method 1100B may be performed to train an imaging examination order classifier, such as the second embodiment of an imaging examination order classifier 310, shown in FIG. 3, to map imaging examination orders into a site-independent, standardized radiology protocol representation, thus enabling a single trained imaging examination order classifier (or digital copies thereof) to serve multiple healthcare facilities, without concomitant retraining.

Method 1100B begins at operation 1102B, wherein the radiology protocol recommendation system selects a training data pair comprising an imaging examination order and a ground truth standardized radiology protocol representation. In some embodiments, training data pairs may be collected from multiple healthcare facilities, e.g., by recording imaging examination orders and the radiology protocols into which the imaging examination orders mature, and annotating the radiology protocols (e.g., by using a standard medical lexicon such as RADLEX to describe attributes of the radiology protocol) to produce the ground truth standardized radiology protocol representations.

At operation 1104B, the radiology protocol recommendation system converts the unstructured text data of the imaging examination order into one or more feature vectors (see FIGS. 5, 6, 9, 10A, 10B, 10C for additional description). Briefly, the radiology protocol recommendation system may convert the procedure description included in the imaging examination order into a procedure description vector comprising a pre-determined number of numerical codes in a pre-determined number of description categories. In some embodiments, the radiology protocol recommendation system may convert unstructured text in the form of order comments (e.g., "reasons for the exam", patient indications, radiology reports, etc.) into a plurality of feature vectors, by identifying named-entities in one or more named-entity classes relevant to the imaging examination order, mapping the identified named-entities to corresponding standardized medical codes, and encoding the standardized medical codes as vectors to produce the plurality of feature vectors.

At operation 1106B, the radiology protocol recommendation system maps structured data of the imaging examination order and the one or more feature vectors produced from unstructured text, to a predicted standardized radiology protocol representation using an imaging examination order classifier. In some embodiments, the imaging examination order classifier may include a distinct multi-class classifier for each of a plurality of attributes of a standardized radiology protocol representation (wherein attributes may include an imaging modality, a body region, an anatomical focus, and a pharmacological treatment, and patient indications). As an example, a first multi-class classifier may receive a first feature vector produced by encoding the structured data included in the imaging examination order, a second feature vector produced by encoding information extracted from the procedure description, and a third feature vector (or plurality of feature vectors) produced by encoding information extracted from the order comments, and map the feature vectors to an imaging modality attribute of the predicted standardized radiology protocol representation. A second multi-class classifier may also receive the first, second, and third feature vectors, and map the feature vectors to a body region to be scanned during the requested imaging examination, and so on for each of a pre-determined number of attributes defining a standardized radiology protocol representation. In embodiments wherein the imaging examination order classifier comprises a plurality of distinct multi-class classifiers, method 1100B may be employed to train each of the plurality of multi-class classifiers using a same training data set, e.g., by performing operations 1108B, and 1110B for each of the plurality of multi-class classifiers.

In another embodiment, the imaging examination order classifier may comprise a single multi-class classifier, wherein, instead of predicting each attribute of a standardized radiology protocol representation individually, the imaging examination order classifier makes predictions at the level of standardized radiology protocol representations, comprising a pre-determined set of attributes. As an example, the imaging examination order classifier may map the first, second, and third feature vectors, to a single classification vector, having a vector of length N, wherein N is a positive integer greater than one, and wherein N is equal to a number of distinct standardized radiology protocol representations.

At operation 1108B, the radiology protocol recommendation system determines a loss for the predicted standardized radiology protocol representation based on the ground truth standardized radiology protocol representation. In embodiments in which the imaging examination order classifier comprises an ensemble of multi-class classifier (e.g., one multi-class classifier per attribute of the standardized radiology protocol representation), operation 1108B may include determining a loss for each predicted attribute, which may then be used to separately adjust the parameters of each multi-class classifier at operation 1110B. However, in embodiments in which the imaging examination order classifier comprises a single multi-class classifier, operation 1110B includes determining a single loss value, by comparing the predicted standardized radiology protocol representation with the ground truth standardized radiology protocol representation. In some embodiments, a loss function, such as a cross-entropy loss, may be used to determine the loss for the predicted radiology protocol.

At operation 1110B, the weights and biases of the imaging examination order classifier are adjusted based on the loss determined at operation 1108B. In some embodiments, the parameters of the imaging examination order classifier, may be adjusted to reduce the loss over a training data set. In some embodiments, parameters of the machine learning models used to encode the unstructured text (e.g., the embedding models, the NER models, and/or the multi-class classifiers/binary classifiers used to standardize the procedure description) may be frozen, that is, may not be adjusted during execution of operation 1110B. However, in some embodiments, parameters of the machine learning models used to encode the unstructured text (e.g., the embedding models, the NER models, and/or the multi-class classifiers/binary classifiers used to standardize the procedure description) may be adjusted along with parameters of the imaging examination order classifier, thus enabling an end-to-end training of the machine learning models used to predict standardized radiology protocol representations from imaging examination orders.

In some embodiments, back propagation of the loss may occur according to a gradient descent algorithm, wherein a gradient of the loss function (a first derivative, or approximation of the first derivative) is determined for each weight and bias of the imaging examination order classifier. Each weight (and bias) of the imaging examination order classifier is then updated by adding the negative of the product of the gradient determined (or approximated) for the weight (or bias) with a predetermined step size. Following operation 1110B, method 1100B may end.

It will be noted that method 1100B may be repeated for each of a plurality of training data pairs in a training data set, and this process may be repeated until a stop condition is met. Wherein, in some embodiments, the stop condition comprises one or more of the loss decreasing to below a threshold loss, a rate of loss change decreasing to below a threshold rate of loss change, a validation loss, determined over a validation data set, reaching a minimum, etc.

Figure 12:
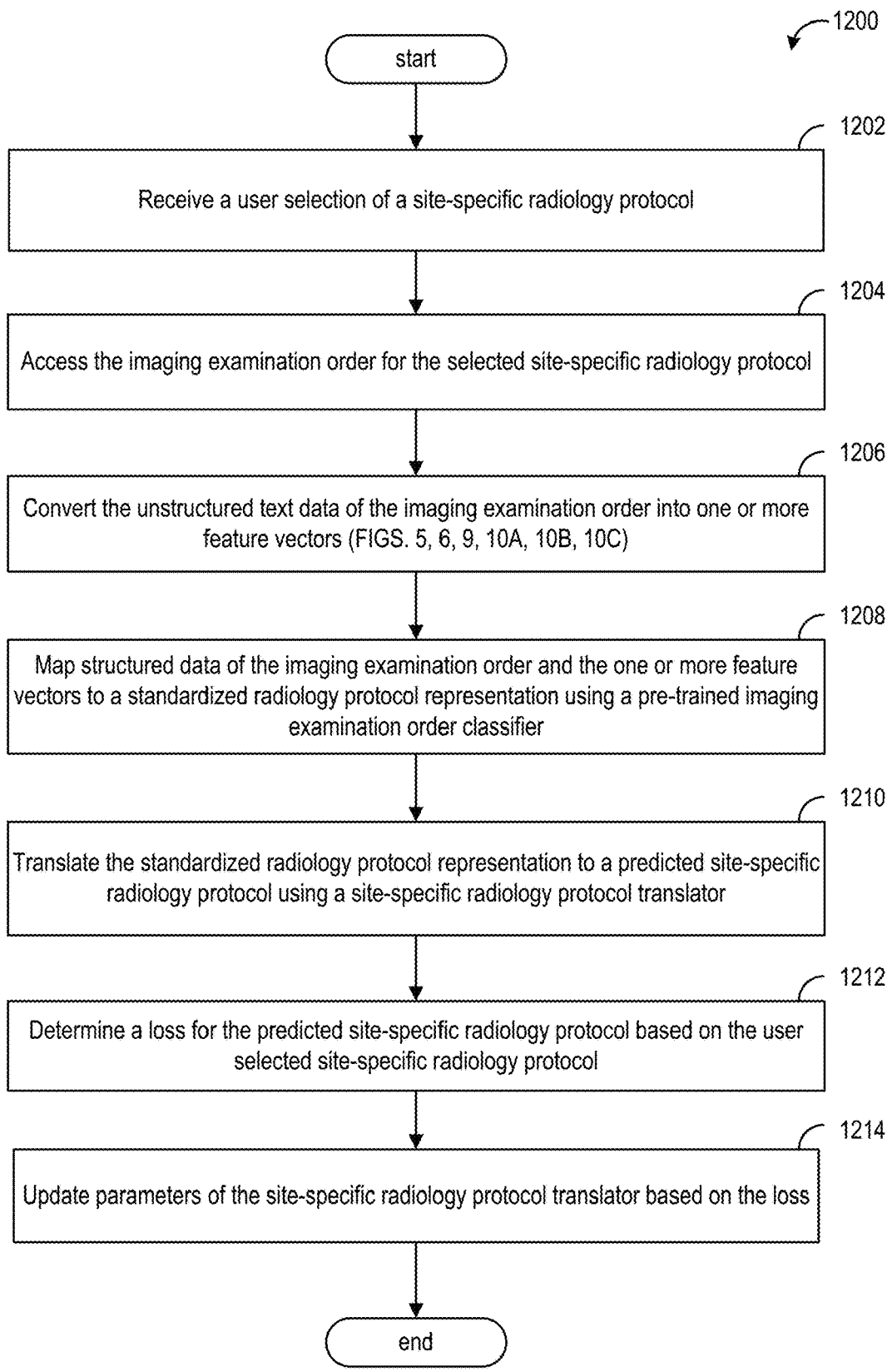
FIG. 12 shows a flowchart illustrating a method for online training of the site-specific radiology protocol translator, according to an embodiment of the disclosure.

Turning to FIG. 12, a flowchart of an embodiment of a training method 1200 for training a site-specific radiology protocol translator to map standardized radiology protocol representations to site-specific radiology protocols, is shown. Method 1200 may be executed at a deployment site, in substantially real-time. In some embodiments, method 1200 may be performed by a radiology protocol recommendation system, such as site-specific radiology protocol recommendation system 100. Method 1200 may be performed to train a site-specific radiology protocol translator, such as the site-specific radiology protocol translator 324, shown in FIG. 3, to map standardized radiology protocol representations to a site-specific radiology protocol, thus enabling a single, pre-trained imaging examination order classifier to efficiently scale to multiple healthcare facilities, by only performing site-specific re-training of the site-specific radiology protocol translator. As the site-specific radiology protocol translator may comprise a substantially smaller and less computationally intensive machine learning model than the imaging examination order classifier, an amount of computational resources used to scale a radiology protocol recommendation system to multiple health care facilities may thus be reduced by bypassing the need to retain the imaging examination order classifier at each deployment site.

Method 1200 begins at operation 1202, wherein the radiology protocol recommendation system receives a user selection of a site-specific radiology protocol. In some embodiments, a radiologist, technologist, or other care provider, may make a selection of a radiology protocol, e.g., by using a care provider device to select a site-specific radiology protocol from a list presented via a user interface.

At operation 1204, the radiology protocol recommendation system accesses the imaging examination order for the selected site-specific radiology protocol. In some embodiments, the radiology protocol recommendation system may access the imaging examination order which prompted the selection of the site-specific radiology protocol by accessing a medical information system, such as an HIS, an RIS, or an EHR database. In some embodiments, the imaging examination order and a site-specific radiology protocol executed based thereon may be correlated to each other via inclusion of a same ordering number in both the imaging examination order and the selected radiology protocol.

At operation 1206, the radiology protocol recommendation system converts the unstructured text data of the imaging examination order into one or more feature vectors (see FIGS. 5, 6, 9, 10A, 10B, 10C for additional description). Briefly, the radiology protocol recommendation system may convert the procedure description included in the imaging examination order into a procedure description vector comprising a pre-determined number of numerical codes in a pre-determined number of description categories. In some embodiments, the radiology protocol recommendation system may convert unstructured text in the form of order comments (e.g., "reasons for the exam", patient indications, radiology reports, etc.) into a plurality of feature vectors, by identifying named-entities in one or more named-entity classes relevant to the imaging examination order, mapping the identified named-entities to corresponding standardized medical codes, and encoding the standardized medical codes as vectors to produce the plurality of feature vectors.

At operation 1208, the radiology protocol recommendation system maps structured data of the imaging examination order and the one or more feature vectors produced from the unstructured text, to a standardized radiology protocol representation using a pre-trained imaging examination order classifier. In some embodiments, the pre-trained imaging examination order classifier comprises a machine learning model trained according to one or more of the operations of method 1100B, shown in FIG. 11B. Operation 1208 may proceed in a manner similar to that described with reference to operations 806 of method 800, and 1106B of method 1100B.

At operation 1210, the radiology protocol recommendation system translates the standardized radiology protocol representation to a predicted site-specific radiology protocol using a site-specific radiology protocol translator. In some embodiments, the site-specific radiology protocol translator may comprise a multi-class classifier, configured to receive the standardized radiology protocol representation as input, and map the standardized radiology protocol representation to the site-specific radiology protocol (e.g., via a classification vector, wherein each row of the classification vector corresponds to a distinct site-specific radiology protocol).

At operation 1212, the radiology protocol recommendation system determines a loss for the predicted site-specific radiology protocol based on the user selected radiology protocol received at operation 1202. In embodiments in which the site-specific radiology protocol translator comprises an ensemble of multi-class classifier (e.g., one multi-class classifier per attribute of the site-specific radiology protocol), operation 1212 may include determining a loss for each predicted attribute, which may then be used to separately adjust the parameters of each multi-class classifier at operation 1214. However, in embodiments in which the site-specific radiology protocol translator comprises a single multi-class classifier, operation 1212 includes determining a single loss value, by comparing the predicted site-specific radiology protocol with the user selected radiology protocol. In some embodiments, a loss function, such as a cross-entropy loss, may be used to determine the loss for the predicted radiology protocol.

At operation 1214, the weights and biases of the site-specific radiology protocol translator are adjusted based on the loss determined at operation 1212. In some embodiments, the parameters of the site-specific radiology protocol translator, may be adjusted to reduce the loss over a training data set. Parameters of the pre-trained imaging examination order classifier may be frozen during execution of method 1200, that is, may not be adjusted or updated based upon the loss. In some embodiments, back propagation of the loss may occur according to a gradient descent algorithm, wherein a gradient of the loss function (a first derivative, or approximation of the first derivative) is determined for each weight and bias of the imaging examination order classifier. Each weight (and bias) of the imaging examination order classifier is then updated by adding the negative of the product of the gradient determined (or approximated) for the weight (or bias) with a predetermined step size. Following operation 1214, method 1200 may end.

It will be noted that method 1200 may be repeated for each of a plurality of radiology protocols selected by a user, or users, over a duration of time. In some embodiments, method 1200 may continue to be executed after deployment of a site-specific radiology protocol translator, to enable dynamic adjustments to changes in imaging capabilities, and/or site-specific conventions in describing radiology protocols.

The disclosure also provides support for a method, comprising: receiving an imaging examination order requesting an imaging examination, wherein the imaging examination order comprises structured data and unstructured text, converting the unstructured text into one or more feature vectors, mapping the structured data and the one or more feature vectors to a standardized radiology protocol representation using an imaging examination order classifier, and mapping the standardized radiology protocol representation to a site-specific radiology protocol using a site-specific radiology protocol translator. In a first example of the method, the unstructured text includes a procedure description, the procedure description including one or more of a pre-determined number of description categories, wherein the pre-determined number of description categories comprises: a body region to examine, an anatomical focus within the body region, an imaging modality to employ for the imaging examination, a modality modifier to apply to the imaging modality, a pharmacological treatment to apply prior to the imaging examination, and a laterality of the imaging examination. In a second example of the method, optionally including the first example, converting the unstructured text into one or more feature vectors comprises: accessing a search pattern repository, including one or more search patterns for each of the pre-determined number of description categories, matching substrings in the procedure description with the one or more search patterns for each of the pre-determined number of description categories, and for each of the pre-determined number of description categories with at least one matching substring: mapping the at least one matching substring to a standardized code. In a third example of the method, optionally including one or both of the first and second examples, converting the unstructured text into one or more feature vectors comprises: accessing a plurality of multi-class classifiers, including at least one multi-class classifier for each of the pre-determined number of description categories, feeding the procedure description to each of the plurality of multi-class classifiers, and mapping the procedure description to one or more standardized codes using the plurality of multi-class classifiers. In a fourth example of the method, optionally including one or more or each of the first through third examples, converting the unstructured text into one or more feature vectors comprises: for a description category, of the pre-determined number of description categories, included within the procedure description: accessing a plurality of binary classifiers for the description category, feeding the procedure description to the plurality of binary classifiers, mapping the procedure description to a plurality of outputs using the plurality of binary classifiers, and reconciling the plurality of outputs from the plurality of binary classifiers to produce a standardized code for the description category. In a fifth example of the method, optionally including one or more or each of the first through fourth examples, the unstructured text comprises order comments, including one or more patient indications, and reasons for the imaging examination order. In a sixth example of the method, optionally including one or more or each of the first through fifth examples, converting the unstructured text into one or more feature vectors comprises: converting the order comments into a plurality of embedding vectors using an embedding model, identifying named-entities from a pre-determined set of named-entity classes in the order comments by mapping each embedding vector to a named-entity classification vector, mapping the named-entities to a pre-determined set of standardized medical codes, and encoding each of the standardized medical codes as a feature vector. In a seventh example of the method, optionally including one or more or each of the first through sixth examples, the standardized medical codes are ICD-10-CM codes. In a eighth example of the method, optionally including one or more or each of the first through seventh examples, the embedding model comprises one or more of GloVe, a BERT, a BioBERT, Clin BioBERT, ELMO, and RoBERTa. In a ninth example of the method, optionally including one or more or each of the first through eighth examples, the pre-determined set of named-entity classes includes: medical treatments, patient indications, and medical tests. In a tenth example of the method, optionally including one or more or each of the first through ninth examples, the imaging examination order classifier comprises a machine learning model pre-trained to map imaging examination orders to standardized radiology protocol representations, by: selecting a training data pair comprising a training imaging examination order and a ground truth standardized radiology protocol representation, converting unstructured text of the training imaging examination order into one or more feature vectors, mapping structured data of the training imaging examination order and the one or more feature vectors to a predicted standardized radiology protocol representation using the imaging examination order classifier, determining a loss for the predicted standardized radiology protocol representation based on the ground truth standardized radiology protocol representation, and updating parameters of the imaging examination order classifier based on the loss. In a eleventh example of the method, optionally including one or more or each of the first through tenth examples the method further comprising: receiving a user selection of a site-specific radiology protocol, accessing a second imaging examination order for the selected site-specific radiology protocol, converting unstructured text of the second imaging examination order into one or more feature vectors, mapping structured data of the second imaging examination order and the one or more feature vectors to a second standardized radiology protocol representation using the imaging examination order classifier, mapping the second standardized radiology protocol representation to a predicted radiology protocol using the site-specific radiology protocol translator, determining a loss for the predicted radiology protocol based on the selected site-specific radiology protocol, and updating parameters of the site-specific radiology protocol translator based on the loss. In a twelfth example of the method, optionally including one or more or each of the first through eleventh examples, the standardized radiology protocol representation comprises: an imaging modality to employ for the imaging examination, a body region to examine during the imaging examination, an anatomical focus within the body region, a pharmacological treatment to apply prior to the imaging examination, and patient indications.

The disclosure also provides support for a method comprising: receiving an imaging examination order requesting an imaging examination, wherein the imaging examination order comprises: structured data, order comments, including one or more patient indications, and reasons for the imaging examination, and a procedure description, wherein the procedure description includes one or more of a pre-determined number of description categories, comprising: a body region to examine, an anatomical focus within the body region, an imaging modality to employ for the imaging examination, a modality modifier to apply to the imaging modality, a pharmacological treatment to apply prior to the imaging examination, and a laterality of the imaging examination, converting the order comments into a first plurality of feature vectors using an embedding model, converting the procedure description into a second plurality of feature vectors, mapping the structured data, the first plurality of feature vectors, and the second plurality of feature vectors to a site-specific radiology protocol using an imaging examination order classifier, and storing the site-specific radiology protocol in non-transitory memory. In a first example of the method, the imaging examination order classifier comprises a machine learning model trained to map structured data and unstructured text to site-specific radiology protocols by: selecting a training data pair comprising a training imaging examination order and a ground truth site-specific radiology protocol, converting unstructured text of the training imaging examination order into one or more feature vectors, mapping structured data of the training imaging examination order and the one or more feature vectors to a predicted site-specific radiology protocol using the imaging examination order classifier, determining a loss for the predicted site-specific radiology protocol based on the ground truth site-specific radiology protocol, and updating parameters of the imaging examination order classifier based on the loss.

The disclosure also provides support for a radiology protocol recommendation system, comprising: a care provider device, an electronic health record (EHR) database, and a radiology protocol recommendation device, communicatively coupled to the care provider device and the EHR database, the radiology protocol recommendation device comprising: a memory, storing instructions, and a processor, that when executing the instructions, is configured to: receive an imaging examination order from the care provider device, the imaging examination order requesting an imaging examination for a patient, wherein the imaging examination order comprises unstructured text, access structured data for the patient from the EHR database, convert the unstructured text into one or more feature vectors, map the structured data and the one or more feature vectors to a standardized radiology protocol representation using an imaging examination order classifier, map the standardized radiology protocol representation to a site-specific radiology protocol using a site-specific radiology protocol translator, and transmit the site-specific radiology protocol to the care provider device. In a first example of the system the radiology protocol recommendation system further comprising: an imaging device communicatively coupled to the radiology protocol recommendation device, wherein the processor, when executing the instructions, is further configured to: transmit the site-specific radiology protocol to the imaging device. In a second example of the system, optionally including the first example, the unstructured text comprises order comments, including one or more patient indications, and reasons for the imaging examination order, and wherein the processor is configured to convert the unstructured text into one or more feature vectors by: converting the order comments into a plurality of embedding vectors using an embedding model, identifying named-entities from a pre-determined set of named-entity classes in the order comments based on the plurality of embedding vectors, mapping the named-entities to a pre-determined set of standardized medical codes, and encoding each of the standardized medical codes as a feature vector. In a third example of the system, optionally including one or both of the first and second examples, the unstructured text includes a procedure description, the procedure description including one or more of a pre-determined number of description categories, and wherein the processor is configured to convert the unstructured text into one or more feature vectors by: for each of the pre-determined number of description categories: matching the procedure description to one or more of a pre-determined set of standardized codes. In a fourth example of the system, optionally including one or more or each of the first through third examples, the imaging examination order classifier is a pre-trained machine learning model, and wherein the site-specific radiology protocol translator learns to match standardized radiology protocol representations to site-specific radiology protocols via online learning.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
  receiving an imaging examination order requesting an imaging examination, wherein the imaging examination order comprises structured data and unstructured text;
  converting the unstructured text into one or more feature vectors;
  mapping the structured data and the one or more feature vectors to a standardized radiology protocol representation using an imaging examination order classifier, wherein the imaging examination order classifier comprises a machine learning model pre-trained to map imaging examination orders to standardized radiology protocol representations, by:
  selecting a training data pair comprising a training imaging examination order and a ground truth standardized radiology protocol representation;
  converting unstructured text of the training imaging examination order into one or more feature vectors;
  mapping structured data of the training imaging examination order and the one or more feature vectors to a predicted standardized radiology protocol representation using the imaging examination order classifier;
  determining a loss for the predicted standardized radiology protocol representation based on the ground truth standardized radiology protocol representation; and
  updating parameters of the imaging examination order classifier based on the loss;
  mapping the standardized radiology protocol representation to a site-specific radiology protocol using a site-specific radiology protocol translator; and
  executing an imaging examination using the site-specific radiology protocol.

2. The method of claim 1, wherein the unstructured text includes a procedure description, the procedure description including one or more of a pre-determined number of description categories, wherein the pre-determined number of description categories comprises:
  a body region to examine;
  an anatomical focus within the body region;
  an imaging modality to employ for the imaging examination;
  a modality modifier to apply to the imaging modality;
  a pharmacological treatment to apply prior to the imaging examination; and
  a laterality of the imaging examination.

3. The method of claim 2, wherein converting the unstructured text into one or more feature vectors comprises:

accessing a search pattern repository, including one or more search patterns for each of the pre-determined number of description categories;

matching substrings in the procedure description with the one or more search patterns for each of the pre-determined number of description categories; and for each of the pre-determined number of description categories with at least one matching substring:
mapping the at least one matching substring to a standardized code.

4. The method of claim 2, wherein converting the unstructured text into one or more feature vectors comprises:
accessing a plurality of multi-class classifiers, including at least one multi-class classifier for each of the pre-determined number of description categories;
feeding the procedure description to each of the plurality of multi-class classifiers; and
mapping the procedure description to one or more standardized codes using the plurality of multi-class classifiers.

5. The method of claim 2, wherein converting the unstructured text into one or more feature vectors comprises:
for a description category, of the pre-determined number of description categories, included within the procedure description:
accessing a plurality of binary classifiers for the description category;
feeding the procedure description to the plurality of binary classifiers;
mapping the procedure description to a plurality of outputs using the plurality of binary classifiers; and
reconciling the plurality of outputs from the plurality of binary classifiers to produce a standardized code for the description category.

6. The method of claim 1, wherein the unstructured text comprises order comments, including one or more patient indications, and reasons for the imaging examination order.

7. The method of claim 6, wherein converting the unstructured text into one or more feature vectors comprises:
converting the order comments into a plurality of embedding vectors using an embedding model;
identifying named-entities from a pre-determined set of named-entity classes in the order comments by mapping each embedding vector to a named-entity classification vector;
mapping the named-entities to a pre-determined set of standardized medical codes; and
encoding each of the standardized medical codes as a feature vector.

8. The method of claim 7, wherein the standardized medical codes are ICD-10-CM codes.

9. The method of claim 7, wherein the embedding model comprises one or more of GloVe, a BERT, a BioBERT, Clin BioBERT, ELMO, and ROBERTa.

10. The method of claim 7, wherein the pre-determined set of named-entity classes includes:
medical treatments;
patient indications; and
medical tests.

11. The method of claim 1, the method further comprising:
receiving a user selection of a site-specific radiology protocol;
accessing a second imaging examination order for the selected site-specific radiology protocol;
converting unstructured text of the second imaging examination order into one or more feature vectors;
mapping structured data of the second imaging examination order and the one or more feature vectors to a second standardized radiology protocol representation using the imaging examination order classifier;
mapping the second standardized radiology protocol representation to a predicted radiology protocol using the site-specific radiology protocol translator;
determining a loss for the predicted radiology protocol based on the selected site-specific radiology protocol; and
updating parameters of the site-specific radiology protocol translator based on the loss.

12. The method of claim 1, wherein the standardized radiology protocol representation comprises:
an imaging modality to employ for the imaging examination;
a body region to examine during the imaging examination;
an anatomical focus within the body region;
a pharmacological treatment to apply prior to the imaging examination; and
patient indications.

13. A method comprising:
receiving an imaging examination order requesting an imaging examination, wherein the imaging examination order comprises:
structured data;
order comments, including one or more patient indications, and reasons for the imaging examination; and
a procedure description, wherein the procedure description includes one or more of a pre-determined number of description categories, comprising:
a body region to examine;
an anatomical focus within the body region;
an imaging modality to employ for the imaging examination;
a modality modifier to apply to the imaging modality;
a pharmacological treatment to apply prior to the imaging examination; and
a laterality of the imaging examination;
converting the order comments into a first plurality of feature vectors using an embedding model;
converting the procedure description into a second plurality of feature vectors;
mapping the structured data, the first plurality of feature vectors, and the second plurality of feature vectors to a site-specific radiology protocol using an imaging examination order classifier, wherein the imaging examination order classifier comprises a machine learning model pre-trained to map imaging examination orders to standardized radiology protocol representations, by:
selecting a training data pair comprising a training imaging examination order and a ground truth standardized radiology protocol representation;
converting unstructured text of the training imaging examination order into one or more feature vectors;
mapping structured data of the training imaging examination order and the one or more feature vectors to a predicted standardized radiology protocol representation using the imaging examination order classifier;
determining a loss for the predicted standardized radiology protocol representation based on the ground truth standardized radiology protocol representation; and
updating parameters of the imaging examination order classifier based on the loss;

storing the site-specific radiology protocol in non-transitory memory; and executing an imaging examination using the site-specific radiology protocol.

14. A radiology protocol recommendation system, comprising:

a care provider device;

an electronic health record (EHR) database; and a radiology protocol recommendation device, communicatively coupled to the care provider device and the EHR database, the radiology protocol recommendation device comprising:

a memory, storing instructions; and a processor, that when executing the instructions, is configured to:

receive an imaging examination order from the care provider device, the imaging examination order requesting an imaging examination for a patient, wherein the imaging examination order comprises unstructured text;

access structured data for the patient from the EHR database;

convert the unstructured text into one or more feature vectors;

map the structured data and the one or more feature vectors to a standardized radiology protocol representation using an imaging examination order classifier, wherein the imaging examination order classifier comprises a machine learning model pre-trained to map imaging examination orders to standardized radiology protocol representations, by:

selecting a training data pair comprising a training imaging examination order and a ground truth standardized radiology protocol representation;

converting unstructured text of the training imaging examination order into one or more feature vectors;

mapping structured data of the training imaging examination order and the one or more feature vectors to a predicted standardized radiology protocol representation using the imaging examination order classifier;

determining a loss for the predicted standardized radiology protocol representation based on the ground truth standardized radiology protocol representation; and updating parameters of the imaging examination order classifier based on the loss;

map the standardized radiology protocol representation to a site-specific radiology protocol using a site-specific radiology protocol translator;

execute an imaging examination using the site-specific radiology protocol; and transmit the site-specific radiology protocol to the care provider device.

15. The radiology protocol recommendation system of claim 14, the radiology protocol recommendation system further comprising:

an imaging device communicatively coupled to the radiology protocol recommendation device;

wherein the processor, when executing the instructions, is further configured to:

transmit the site-specific radiology protocol to the imaging device.

16. The radiology protocol recommendation system of claim 14, wherein the unstructured text comprises order comments, including one or more patient indications, and reasons for the imaging examination order, and wherein the processor is configured to convert the unstructured text into one or more feature vectors by:

converting the order comments into a plurality of embedding vectors using an embedding model;

identifying named-entities from a pre-determined set of named-entity classes in the order comments based on the plurality of embedding vectors;

mapping the named-entities to a pre-determined set of standardized medical codes; and encoding each of the standardized medical codes as a feature vector.

17. The radiology protocol recommendation system of claim 14, wherein the unstructured text includes a procedure description, the procedure description including one or more of a pre-determined number of description categories, and wherein the processor is configured to convert the unstructured text into one or more feature vectors by:

for each of the pre-determined number of description categories:

matching the procedure description to one or more of a pre-determined set of standardized codes.

18. The radiology protocol recommendation system of claim 14, wherein the imaging examination order classifier is a pre-trained machine learning model, and wherein the site-specific radiology protocol translator learns to match standardized radiology protocol representations to site-specific radiology protocols via online learning.

* * * * *